United States Patent
Yamamoto et al.

(10) Patent No.: US 7,198,336 B2
(45) Date of Patent: Apr. 3, 2007

(54) VEHICULAR BRAKE CONTROL APPARATUS AND CONTROL METHOD OF VEHICULAR BRAKE APPARATUS

(75) Inventors: Takayuki Yamamoto, Aichi-gun (JP); Naoki Sawada, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 0 days.

(21) Appl. No.: 10/381,702

(22) PCT Filed: Sep. 28, 2001

(86) PCT No.: PCT/IB01/01790

§ 371 (c)(1),
(2), (4) Date: Mar. 27, 2003

(87) PCT Pub. No.: WO02/26539

PCT Pub. Date: Apr. 4, 2002

(65) Prior Publication Data

US 2004/0104618 A1    Jun. 3, 2004

(30) Foreign Application Priority Data

Sep. 28, 2000    (JP) .............................. 2000-296132

(51) Int. Cl.
*B60T 8/64* (2006.01)
*B60T 13/00* (2006.01)

(52) U.S. Cl. ........................ 303/157; 303/20; 303/162; 188/158

(58) Field of Classification Search .................. 303/20, 303/162, 112, 154, 155, 157; 188/72.6, 72.7, 188/72.8, 156, 157, 158, 159, 160, 161, 162
See application file for complete search history.

(56) References Cited

U.S. PATENT DOCUMENTS 4,658,939 A * 4/1987 Kircher et al. ................ 303/20

(Continued)

FOREIGN PATENT DOCUMENTS

DE    195 30 735 A1    8/1995

(Continued)

OTHER PUBLICATIONS

International Preliminary Examination Report Sep. 28, 2000, PCT/IB01/01790.
Japanese Office Action and English translation of Examiner's Comments.

*Primary Examiner*—Thomas Williams
(74) *Attorney, Agent, or Firm*—Kenyon & Kenyon LLP

(57) ABSTRACT

A vehicular brake control apparatus includes a braked member that rotates together with a wheel, a braking member, an electric driving device that presses the braking member against the braked member to apply a braking torque to the wheel, when being supplied with electric current, an operational state detector that detects an operational state of the vehicle and provides a quantity of state representative of the operational state of the vehicle, a braking torque change request determiner that selectively determines that the braking torque is to be increased and that the braking torque is to be reduced, based on the quantity of state, and a current controller that controls supply of electrical current to the electric driving device so that the electric driving device is caused to drive in a predetermined direction if it is determined that the braking torque is to be increased, and so that the electric driving device does not drive in the predetermined direction if it is determined that the braking torque is to be reduced.

13 Claims, 17 Drawing Sheets

U.S. PATENT DOCUMENTS

| | | | |
|---|---|---|---|
| 4,995,483 A | | 2/1991 | Moseley et al. .............. 188/162 |
| RE33,663 E | * | 8/1991 | Kade et al. .................. 303/162 |
| 5,071,199 A | * | 12/1991 | Spadafora et al. ........... 303/162 |
| 5,090,518 A | * | 2/1992 | Schenk et al. ................. 303/20 |
| 5,139,315 A | * | 8/1992 | Walenty et al. .............. 303/162 |
| 5,281,009 A | * | 1/1994 | Kidston et al. .............. 303/157 |
| 5,829,557 A | | 11/1998 | Halasy-Wimmer et al. |
| 5,962,997 A | | 10/1999 | Maisch |
| 6,109,703 A | * | 8/2000 | Takahashi ................... 303/155 |
| 6,132,016 A | * | 10/2000 | Salamat et al. ............. 303/112 |
| 6,299,261 B1 | * | 10/2001 | Weiberle et al. ............... 303/20 |
| 6,397,981 B1 | * | 6/2002 | Tamasho et al. ............ 188/156 |
| 6,416,140 B1 | | 7/2002 | Yamamoto et al. .......... 303/122 |
| 6,431,330 B1 | * | 8/2002 | Poertzgen et al. ........... 188/156 |
| 6,476,515 B1 | | 11/2002 | Yamamoto et al. ........ 307/10.1 |
| 6,607,253 B1 | * | 8/2003 | Yamamoto et al. .......... 303/112 |
| 6,679,356 B2 | * | 1/2004 | Hageman et al. ............ 188/156 |

FOREIGN PATENT DOCUMENTS

| | | |
|---|---|---|
| DE | 196 28 771 A1 | 1/1998 |
| DE | 198 13 194 A1 | 3/1998 |
| DE | 198 26 131 A1 | 6/1998 |
| DE | 197 47 093 | 5/1999 |
| DE | 199 51 266 | 6/2001 |
| EP | 0 894 685 | 2/1999 |
| EP | 1 095 834 | 5/2001 |
| JP | A 3-50059 | 3/1991 |
| JP | A 3-57755 | 3/1991 |
| JP | A 3-246156 | 11/1991 |
| JP | A 4-108058 | 4/1992 |
| JP | A 4-208666 | 7/1992 |
| JP | 09-014304 | 1/1997 |
| JP | 09-264351 | 10/1997 |
| JP | 09-295564 | 11/1997 |
| JP | A 10-504876 | 5/1998 |
| JP | 11-101282 | 4/1999 |
| JP | 11-217073 | 8/1999 |
| JP | 11-511092 | 9/1999 |
| JP | A 2000-62591 | 2/2000 |
| JP | 2000-130482 | 5/2000 |
| KR | 10-0231574 | 11/1998 |
| KR | 10-0381771 | 1/2000 |

* cited by examiner

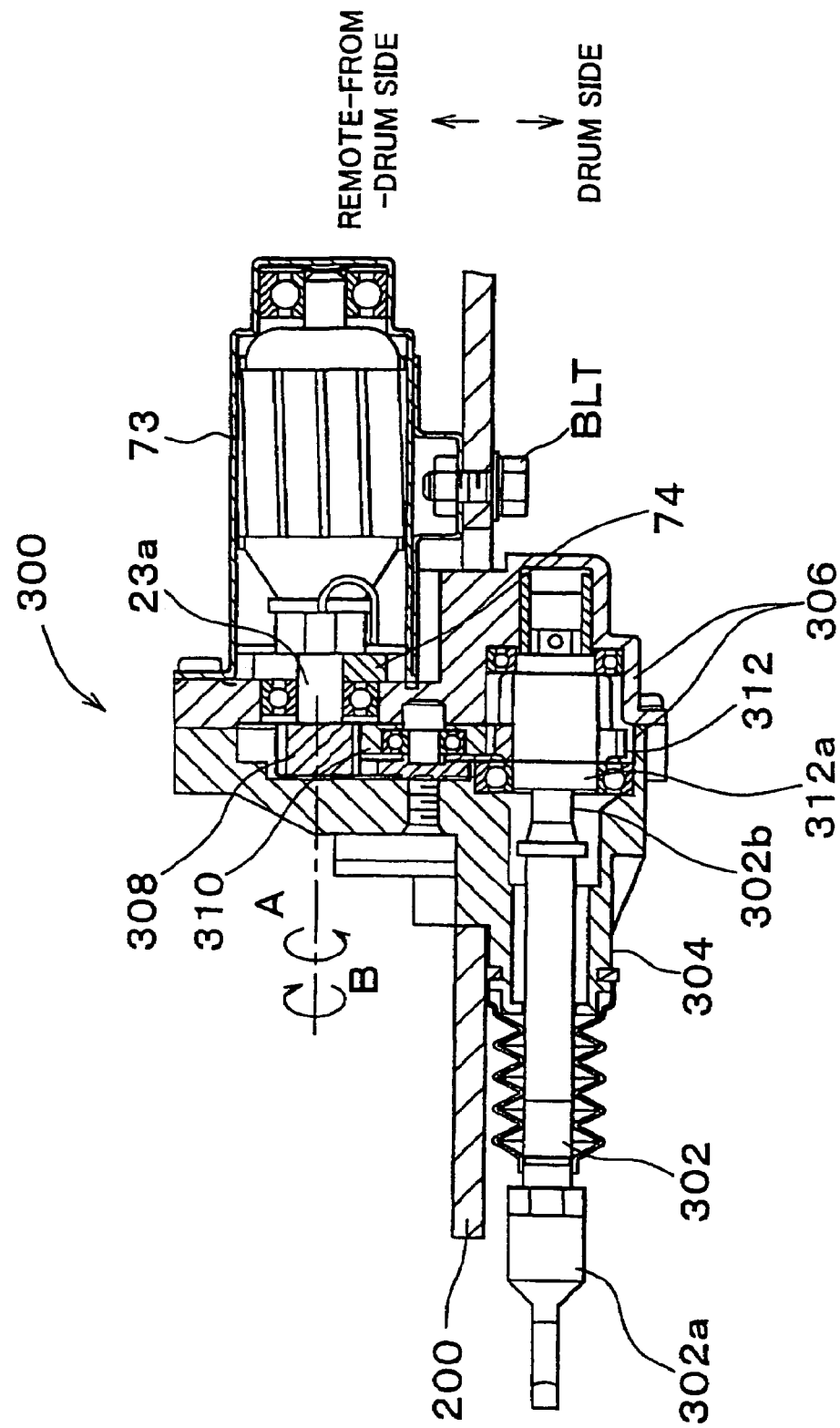

VEHICULAR BRAKE CONTROL APPARATUS AND CONTROL METHOD OF VEHICULAR BRAKE APPARATUS

FIELD OF THE INVENTION

The invention relates to vehicular brake control apparatuses and control methods of vehicular brake apparatus for controlling braking torque via an electric driving device.

BACKGROUND OF THE INVENTION

The aforementioned type of brake control apparatus is disclosed in, for example, Japanese Patent Application Laid-Open No. HEI 9-264351. This patent application discloses a structure of an actuator for an electric brake. The actuator includes a mechanism that converts rotation of an electric motor into linear movements of a piston, and a mechanism that produces braking torque by pressing a brake pad against a disc rotor via the piston. This application also teaches that the aforementioned actuator can be used for various brake controls, such as an antilock control, a traction control, an automatic brake control, etc.

However, the aforementioned patent application does not specifically describe how to control the electric motor during a brake control.

It is a first object of the invention to provide a vehicular brake control apparatus that is capable of performing an effective brake control with an actuator for an electric brake installed in a vehicle.

It is a second object of the invention to provide a control method that is capable of performing an effective brake control with an actuator for an electric brake installed in a vehicle.

SUMMARY OF THE INVENTION

The first object is solved by a control apparatus for vehicular brake apparatuses. The first object is solved by control methods that refer to a method of controlling the vehicular brake control apparatus in accordance with the present invention.

In the following, preferred modes of the vehicular brake control apparatus and control methods in accordance with the present invention are presented.

A first mode of the invention is a vehicular brake control apparatus comprising: a braked member that rotates together with a wheel; a braking member that produces a braking torque when pressed against the braked member; an electric driving device that presses the braking member against the braked member by driving in a predetermined direction so as to apply a braking torque to the wheel when being supplied with electric current; current supplying means for supplying the electric driving device with an electric current; operational state detecting means for detecting an operational state of the vehicle and providing a quantity of state representative of the operational state of the vehicle; braking torque change request determining means for determining selectively whether the braking torque is to be increased and whether the braking torque is to be reduced based on the quantity of state of the vehicle detected; and current controlling means for controlling the supply of electric current to the electric driving device so that the electric driving device drives in the predetermined direction if it is determined that the braking torque is to be increased, and so that the electric driving device does not drive in, predetermined direction if it is determined that the braking torque is to be reduced.

According to this mode, if it is determined that the braking torque should be increased based on the quantity of state of the vehicle, electric current is supplied to the electric driving device so as to drive the electric driving device in the predetermined direction, thereby increasing the braking torque. Furthermore, if it is determined that the braking torque should be reduced based on the quantity of state of the vehicle, the electric driving device does not drive in the predetermined direction if it is determined that the braking torque is to be reduced, thereby reducing the braking torque.

The reason why the braking torque decreases when the electric driving device does not drive in a the predetermined direction is as follows. When the braking member is pressed against the braked member and thereby is producing braking torque, the braking member is in a compressed state. Therefore, if, by controlling the supply of the electrical current to the electric driving device so that does not drive the electric driving device in the predetermined direction, the force pressing the braking member against the braked member is eliminated, is changed into negative force or is lower than a restoring force of the braking member to restore in its original state, the braking member tends to return to a state prior to the compressed state.

A second mode of the invention is a vehicular brake control apparatus comprising: a braked member that rotates together with a wheel; a braking member that produces a braking torque when pressed against the braked member; an electric driving device that presses the braking member against the braked member by driving in a predetermined direction so as to apply a braking torque to the wheel, when being supplied with electric current; current supplying means for supplying the electric driving device with an electric current; operational state detecting means for detecting an operational state of the vehicle and providing a quantity of state representative of the operational state of the vehicle; braking torque change request determining means for determining selectively whether the braking torque is to be increased and whether the braking torque is to be reduced, based on the quantity of state of the vehicle detected; and current controlling means for controlling the supply of electric current to the electric driving device so that the electric driving device drives in the predetermined direction if it is determined that the braking torque is to be increased, and so that the electric current supply to the electric driving device is discontinued (stop supplying the current, or set the amount of current to "0") if it is determined that the braking torque is to be reduced.

According to this mode, if it is determined that the braking torque should be increased based on the quantity of state of the vehicle, the electric driving device is supplied with a current that drives the electric driving device in the predetermined direction, thereby increasing the braking torque. In contrast, if it is determined that the braking torque should be reduced based on the quantity of state of the vehicle, the electric driving device is not supplied with electric current. When the braking member is pressed against the braked member and is therefore producing braking torque, the braking member is in a compressed state. Hence, if the force pressing the braking member against the braked member is eliminated by discontinuing the supply of current to the electric driving device, the braking member returns to an original configuration, so that the braking torque is reduced.

In this case, it is preferable that the vehicular brake control apparatus comprise return force applying means for applying to the electric driving device a force in a direction opposite to a direction of a force whereby the electric driving device presses the braking member against the braked member.

Therefore, if the force pressing the braking member against the braked member is eliminated by discontinuing the supply of current to the electric driving device, the braking torque reliably reduces due to the force by the return force applying means in addition to the restoring force of the braking member.

A third mode of the invention is a vehicular brake control apparatus comprising: a braked member that rotates together with a wheel; a braking member that produces a braking torque when pressed against the braked member; an electric driving device that presses the braking member against the braked member by driving in a predetermined direction so as to apply a braking torque to the wheel, when being supplied with electric current; current supplying means for supplying electric current to the electric driving device; operational state detecting means for detecting an operational state of the vehicle and providing a quantity of state representative of the operational state of the vehicle; braking torque change request determining means for determining selectively whether the braking torque is to be increased and whether the braking torque is to be reduced, based on the quantity of state of the vehicle detected; and current controlling means for controlling the supply of electric current to the electric driving device so that the electric driving device drives in the predetermined direction if it is determined that the braking torque is to be increased, and so that the electric driving device is supplied with electric current that drives the electric driving device in a direction opposite to the predetermined direction if it is determined that the braking torque is to be reduced.

According to this mode, if it is determined that the braking torque should be increased based on the quantity of state of the vehicle, the electric driving device is supplied with an electric current that drives the electric driving device in the predetermined direction, thereby increasing the braking torque. In contrast, if it is determined that the braking torque should be reduced based on the quantity of state of the vehicle, the electric driving device is supplied with an electric current that drives the electric driving device in the direction opposite to the predetermined direction. When the braking member is pressed against the braked member and is therefore producing braking torque, the braking member is in a compressed state. Hence, if the force pressing the braking member against the braked member is eliminated by discontinuing the supply of current to the electric driving device, the braking member returns to an original configuration. However, if a motion converting mechanism disposed between the electric driving device and the braking member is a mechanism that does not efficiently transfer force from the side of the braking member to the side of the electric driving device, the braking torque cannot be reduced in a good fashion merely by the restoration force of the braking member. Therefore, the electric driving device is reversely driven to reliably reduce the braking torque.

In this case, it is preferable that the vehicular brake control apparatus comprise return force applying means for applying to the electric driving device a force in a direction opposite to a direction of a force whereby the electric driving device presses the braking member against the braked member.

With the above-described return force applying means provided, it becomes possible to reduce the braking torque by eliminating the force pressing the braking member against the braked member through discontinuation of the supply of current to the electric driving device. However, when there is a request for a reduction in the braking torque, for example, when excessive slip is to be reduced, it is desirable that the electric driving device be reversely operated by the above-described feature so as to reliably reduce the braking torque without a delay.

A fourth mode of the invention is a vehicular brake control apparatus comprising: a braked member that rotates together with a wheel; a braking member that produces a braking torque when pressed against the braked member; an electric driving device that presses the braking member against the braked member by driving in a predetermined direction so as to apply a braking torque to the wheel, when being supplied with electric current; current supplying means for supplying electric current to the electric driving device; brake operation detecting means for detecting a brake operation performed by an operating person and providing a quantity of brake operation representative of the brake operation; operational state detecting means for detecting an operational state of the vehicle other than the quantity of brake operation and providing a quantity of state representative of the operational state; and current controlling means for controlling the supply of electric current to the electric driving device so that it is discontinued if it is determined that the braking torque is to be reduced based on the quantity of brake operation, and so that the electric driving device is supplied with an electric current that drives the electric driving device in a direction opposite to the predetermined direction if it is determined that the braking torque is to be reduced based on the quantity of state.

According to this mode, if it is determined that the braking torque should be reduced based on the quantity of brake operation detected by the quantity-of-brake operation detecting means, the current supplied to the electric driving device is discontinued. In contrast, if it is determined that the braking torque should be reduced based on the quantity of state other than the quantity of brake operation, the electric driving device is supplied with an electric current that drives the electric driving device in the direction opposite to the predetermined direction. If the electric driving device is a electric motor, as a braking torque reduction request based on the quantity of brake operation, such as the brake pedal depressing force, the amount of depression (stroke) of the brake pedal, etc., responsiveness requirement is not so high. Therefore, the electric current to the motor is discontinued (or, the supply current thereto is reduced), so that the braking torque is reduced due to the restoration force of the braking member or the like. As a result, the frequency of operating the motor (reversing frequency) can be reduced, so that the service life of the motor (a brush-equipped motor in particular) can be increased. In contrast, as for a braking torque reduction request based on the quantity of state of the vehicle (wheel slip rate or the like) other than the quantity of brake operation, high responsiveness is required. Therefore, a predetermined current is supplied to the electric motor so as to quickly reduce the braking torque. As a result, a precise braking torque control can be accomplished. The aforementioned braking torque reduction request based on the quantity of state of the vehicle other than the quantity of brake operation may be determined taking the quantity of brake operation into account.

This construction may be applied to a vehicular brake control apparatus that comprises return force applying means for applying to the electric driving device a force in a direction opposite to a direction of a force whereby the electric driving device presses the braking member against the braked member, achieving substantially the same advantages.

A fifth mode of the invention is a vehicular brake control apparatus comprising: a braked member that rotates together with a wheel; a braking member that produces a braking torque when pressed against the braked member; an electric driving device that presses the braking member against the braked member by driving in a predetermined direction so as to apply a braking torque to the wheel, when being supplied with electric current; current supplying means for supplying the electric driving device with an electric current; operational state detecting means for detecting an operational state of the vehicle and providing a quantity of state representative of the operational state of the vehicle; braking torque change request determining means for determining selectively whether the braking torque is to be increased and whether the braking torque is to be reduced, based on the quantity of state of the vehicle detected; and current controlling means for controlling the supply of electric current to the electric driving device so that the electric driving device drives in the predetermined direction if it is determined that the braking torque is to be increased, and so that the electrical current supplied to the electric driving device is lower than required to drive the electric driving device in a the predetermined direction if it is determined that the braking torque is to be reduced.

The reason why the braking torque decreases when the electrical current supplied to the electric driving device is lower than required to drive the electric driving device in a the predetermined direction is as follows. That is, when the braking member is pressed against the braked member and thereby is producing braking torque, the braking member is in a compressed state. Therefore, if, by making the electrical current supplied to the electric driving device lower than required to drive the electric driving device in the predetermined direction, the force pressing the braking member against the braked member is eliminated, is changed into negative force or is lower than a restoring force of the braking member to restore in its original state, the braking member tends to return to a state prior to the compressed state.

A sixth mode of the invention is a vehicular brake control apparatus comprising: a braking member that produces a braking torque when pressed against the braked member; an electric driving device that presses the braking member against the braked member by driving in a predetermined direction so as to apply a braking torque to the wheel, when being supplied with electric current; current supplying means for supplying the electric driving device with an electric current; operational state detecting means for detecting an operational state of the vehicle and providing a quantity of state representative of the operational state of the vehicle; braking torque change request determining means for determining selectively whether the braking torque is to be increased and whether the braking torque is to be reduced, based on the quantity of state of the vehicle detected; and current controlling means for controlling the supply of electric current to the electric driving device so that the electric driving device drives in the predetermined direction if it is determined that the braking torque is to be increased, and so that electrical current supplied to the electric driving device is insufficient to drive the electric driving device in the predetermined direction if it is determined that the braking torque is to be reduced.

In the first mode to sixth mode, the electric driving device may include an electric motor. In these cases, the electric driving device presses the braking member against the braked member by rotating the motor in the predetermined direction.

A seventh mode of the invention is a vehicular brake control apparatus comprising: a braked member that rotates together with a wheel; a braking member that produces a braking torque when pressed against the braked member; an electric driving device that presses the braking member against the braked member to apply a braking torque to the wheel, when being supplied with electric current; operational state detecting means for detecting an operational state of the vehicle and providing a quantity of state representative of the operational state of the vehicle; and current controlling means for controlling the supply of electric current to the electric driving device so that supplying a predetermined electric current to the electric driving device is started if a requested quantity of change in the braking torque based on the quantity of state of the vehicle detected becomes greater than a predetermined value.

According to this mode, only when the requested quantity of change in the braking torque based on the quantity of state of the vehicle becomes greater than the predetermined amount, the supply of a predetermined electric current to the electric driving device is started so as to drive the electric driving device. For example, if the electric driving device is an electric motor, the frequency of operating (rotating) the electric motor is reduced. Therefore the service life of the electric motor (a brush-equipped motor in particular) can be increased.

In this case, it is preferable that the vehicular brake control apparatus further comprise pressurizing force detecting means for detecting an actual pressurizing force whereby the electric motor presses the braking member against the braked member, and that the current control means be designed to determine a target pressurizing force based on the quantity of sate of the vehicle detected, and to determine the requested quantity of change in the braking torque in accordance with a difference between the actual pressurizing force detected and the target pressurizing force determined.

That is, a construction is provided in which only when the actual pressurizing force becomes greatly different from the target pressurizing force, the electric motor is rotated.

A eighth mode of the invention is a vehicular brake control apparatus comprising: a braked member that rotates together with a wheel; a braking member that produces a braking torque when pressed against the braked member; an electric driving device that presses the braking member against the braked member to apply a braking torque to the wheel, when being supplied with electric current; current supplying means for supplying electric current to the electric driving device; operational state detecting means for detecting an operational state of the vehicle and providing a quantity of state representative of the operational state of the vehicle; and current controlling means for controlling the supply of electric current to the electric driving device so that a predetermined electric current is supplied to the electric driving device if it is determined that the braking torque is to be held at a constant value based on the quantity of state of the vehicle detected.

According to this mode, the electric driving device is supplied with a predetermined current if it is determined that the braking torque should be maintained at a constant value based on the quantity of state of the vehicle detected. Therefore, a reduction in the braking torque due to the restoration force of the braking member can be prevented by the force produced by the electric driving device. Hence, it becomes possible to maintain the braking torque at a constant value.

If the above-described vehicular brake control apparatus comprises return force applying means for applying to the electric driving device a force in a direction opposite to a direction of a force whereby the electric driving device presses the braking member against the braked member, it is preferable that electric current be supplied to the electric driving device in accordance with the aforementioned features. This is because if the electric driving device is not supplied with electric current, the braking torque is reduced by the force of the return force applying means, so that the braking torque cannot be maintained at a constant value.

In the eighth mode, the electric driving device may be an electric motor.

A ninth mode of the invention is a vehicular brake control apparatus comprising: a braked member that rotates together with a wheel; a braking member that produces a braking torque when pressed against the braked member; an electric driving device that presses the braking member against the braked member by a predetermined pressurizing force to apply a braking torque to the wheel, when being supplied with electric current; slip rate detecting means for detecting a slip rate of the wheel; and current controlling means for controlling the supply of electric current to the electric driving device so that a changing rate of the pressurizing force is changed in accordance with the slip rate detected.

In the ninth mode, the electric driving device may be an electric motor.

According to this mode, it becomes possible to perform a precision control of the pressurizing force or the like in which, for example, if the slip rate becomes greater than a predetermined amount, the decreasing rate of the pressurizing force is increased to rapidly reduce the pressurizing force and therefore quickly reduce the slip rate, and when the slip rate decreases to a certain level, the decreasing rate of the pressurizing force is reduced to gently reduce the pressurizing force, and when the slip rate becomes even smaller, the pressurizing force is increased. In particular, it becomes possible to prevent undershoot or overshoot in the switching of the pressurizing force increasing and decreasing directions.

An tenth mode of the invention is a vehicular brake control apparatus comprising: a braked member that rotates together with a wheel; a braking member that produces a braking torque when pressed against the braked member; an electric driving device that presses the braking member against the braked member by a predetermined pressurizing force to apply a braking torque to the wheel, when being supplied with electric current; slip rate detecting means for detecting a slip rate of the wheel; and current controlling means for controlling the supply of electric current to the electric driving device so that the pressurizing force is rapidly reduced and then is gently reduced, if the slip rate detected becomes greater than a predetermined value.

In the tenth mode, the electric driving device may be an electric motor.

According to this mode, if the detected slip rate becomes greater than the predetermined amount, the current supplied to the electric motor is controlled so that the pressurizing force is rapidly reduced and then is gently reduced. Therefore, the rotating speed of the electric motor occurring at the time point at which the slip rate becomes low so that the pressurizing force should be increased can be reduced. Hence, undershoot of the pressurizing force can be prevented.

A eleventh mode of the invention is a vehicular brake control apparatus comprising: a braked member that rotates together with a wheel; a braking member that produces a braking torque when pressed against the braked member; an electric driving device that presses the braking member against the braked member by a predetermined pressurizing force to apply a braking torque to the wheel, when being supplied with electric current; slip rate detecting means for detecting a slip rate of the wheel; and current controlling means for controlling the supply of electric current to the electric driving device so that the pressurizing force is reduced and then is increased and a changing rate of the pressurizing force while the pressurizing force is increased decreases gradually, if the slip rate detected becomes greater than a predetermined value.

According to this mode, when the pressurizing force is increased after being decreased in conjunction with an excessive increase in the slip rate, the increasing rate of the pressurizing force is gradually decreased. Therefore, the possibility that the slip rate will become excessively great and the pressurizing force will be reduced again can be reduced. As a result, frequent repetitions of decreases and increases in the pressurizing force can be avoided.

Furthermore, it is also practicable to adopt a construction in which the braking torque change request determining means is capable of selectively determining whether the braking torque is to be maintained, and in which if it is determined that the braking torque is to be maintained, the electrical driving device may be supplied with an electric current that maintains the braking torque.

This construction makes it possible to perform a fine brake control.

In the eleventh mode, the electric driving device may be an electric motor.

An twelfth mode of the invention is a control method of a vehicular brake control apparatus having a braked member that rotates together with a wheel; a braking member that produces a braking torque when pressed against the braked member; an electric driving device that presses the braking member against the braked member by driving in a predetermined direction so as to apply a braking torque to the wheel, when being supplied with electric current. The method comprises the steps of: detecting an operational state of the vehicle; providing a quantity of state representative of the operational state of the vehicle; determining selectively whether the braking torque is to be increased and is to be reduced, based upon the quantity of state; and controlling the supply of electrical current to the electric driving device so that the electric driving device is caused to drive in a predetermined direction if it is determined that the braking torque is to be increased, and so that the electrical current supplied to the electric driving device does not drive in the predetermined direction if it is determined that the braking torque is to be reduced.

An thirteenth mode of the invention is a control method of a vehicular brake control apparatus having a braked member that rotates together with a wheel; a braking member that produces a braking torque when pressed against the braked member; an electric driving device that presses the braking member against the braked member by a predetermined pressurizing force to apply a braking torque to the wheel, when being supplied with electric current; when being supplied with electric current. The method comprises the steps of:

detecting the operational state of the vehicle includes to detect a slip rate of the wheel, determining whether the slip rate has become greater than a predetermined value, and controlling the supply of electric current to the electric driving device so that the electric driving device is caused to rapidly reduce the braking torque and then gently reduce the braking torque, if the slip rate becomes greater than the predetermined value.

It is preferable that the predetermined value be a value for determining a possibility of the wheel being locked, and that a change in current from a current that causes the electric driving device to rapidly reduce the braking torque to a current that causes the electric driving device to gently reduce the braking torque be carried out when the possibility of the wheel being locked disappears.

According to this method, the braking torque can be controlled so as not to lock the wheel. Therefore, the braking distance of the vehicle can be reduced.

Furthermore, in the thirteenth mode of the invention, it is preferable that in the step of detecting an operational state of the vehicle a slip rate of the wheel be detected, and that the control method further comprise a step of determining whether the slip rate has become greater than a predetermined value, and that, if the slip rate becomes greater than the predetermined value, current supplied to the electric driving device be controlled in the current supplying step so that the electric driving device is caused to rapidly reduce the braking torque and then increase the braking torque, and so that a changing rate of the braking torque while the braking torque is being increased decreases gradually.

In the thirteenth mode, the electrical driving device may be an electric motor.

BRIEF DESCRIPTION OF THE DRAWINGS

FIG. 19 is a sectional view of an electric actuator shown in FIG. 18 taken on line 19—19.

DETAILED DESCRIPTION OF PREFERRED EMBODIMENTS

Embodiments of the vehicular brake control apparatus of the invention will be described hereinafter with reference to the drawings.

Figure 1:
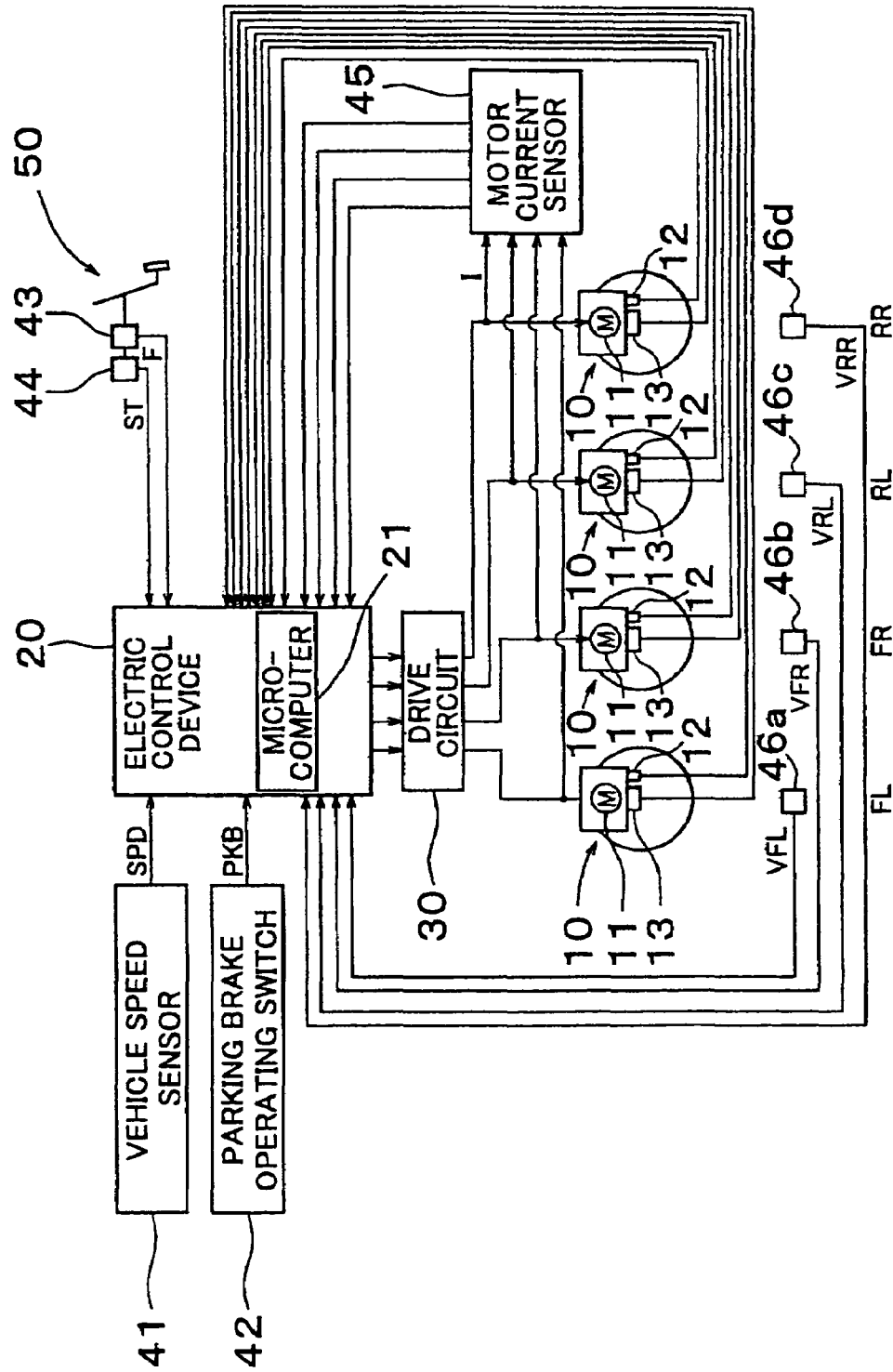
FIG. 1 is a diagram of an overall construction of an electric brake apparatus including a vehicle brake control apparatus in accordance with a first embodiment of the invention.

FIG. 1 shows an entire electric brake apparatus that includes a vehicular brake control apparatus in accordance with a first embodiment.

The electric brake apparatus includes electric disc brakes 10 provided for right and left front wheels FR, FL and right and left rear wheels RR, RL, an electric control device 20, a drive circuit 30, and a brake pedal 50 provided as a brake operating member for a service brake.

Figure 2:
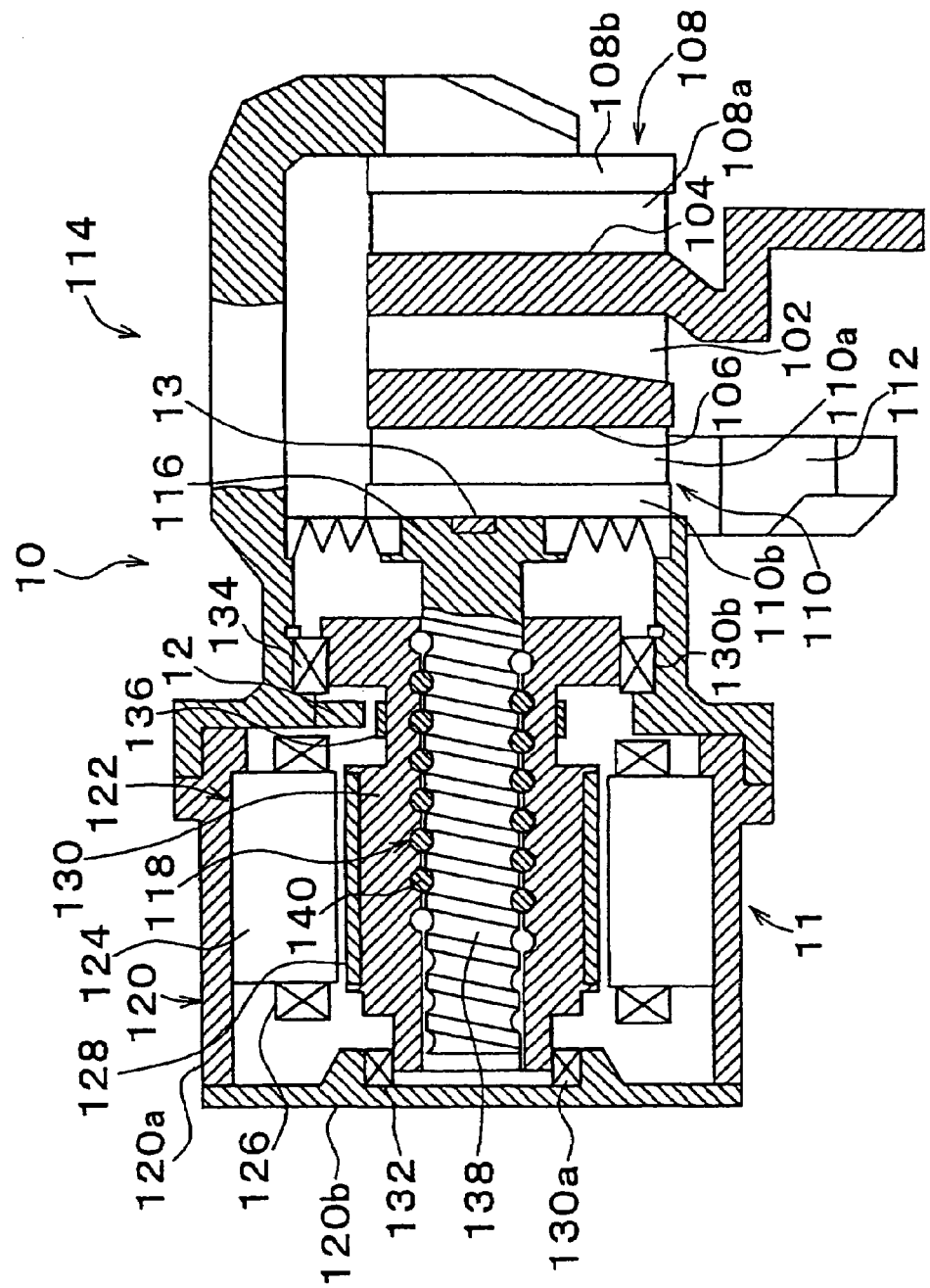
FIG. 2 is a sectional view of an electric disc brake shown in FIG. 1.

Each electric disc brake 10 has a disc rotor 102 that is a drive member rotatable together with a wheel, as illustrated in detail in FIG. 2. Two opposite surfaces of the disc rotor 102 are formed as friction surfaces 104, 106. A pair of brake pads 108, 110 are disposed facing the friction surfaces 104, 106, respectively.

Each brake pad 108, 110 has, on a surface thereof facing the friction surface 104, 106, a friction member 108*a*, 110*a* that contacts the friction surface 104, 106. Each brake pad 108, 110 has a structure in which a steel-made back plate 108*b*, 110*b* is fixed to a back surface of the friction member 108*a*, 110*a*. The brake pad 110 is called inner pad.

Each electric disc brake 10 has a mounting bracket 112. The mounting bracket 112 is unrotatably attached to a vehicle body-side member in such a fashion that the mounting bracket 112 straddles over the two brake pads 108, 110. The mounting bracket 112 holds the two brake pads 108, 110 in such a manner that the brake pads 108, 110 are movable in directions parallel to a rotating axis of the disc rotor 102.

Each electric disc brake 10 includes a caliper 114. The caliper 114 has an integral arm (not shown). Two pins (not shown) extending from the arm parallelly to a pad movement direction are slidably fitted into pin holes of the mounting bracket 112, so that the caliper 114 is held movably in directions parallel to the rotating axis of the disc rotor 102.

A pressurizing member 116 is disposed movably in the directions of the axis in the back of the inner pad 110 of the two brake pads 108, 110. The pressurizing member 116 is designed so that a forward surface of the pressurizing member 116 contacts the back surface of the inner pad 110

(the back plate 110b—side surface) when the pressurizing member 116 is moved a predetermined amount toward the inner pad 110. An electric motor 11 is disposed on a back surface of the pressurizing member 116 (on a side thereof opposite from the inner pad 110). The pressurizing member 116 and the electric motor 11 are disposed coaxially to each other in parallel to the pad movement directions, and are interconnected by a ball screw 118 that serves as a motion converting mechanism.

A housing 120 of the electric motor 11 is formed by a cylindrical main body portion 120a, and a closure portion 120b that closes one of openings of the main body portion 120a. The main body portion 120a and the closure portion 120b are firmly coupled to each other by bolts (not shown). The housing 120 is fixed, at an end portion of the opening thereof opposite from the closure portion 120b, to the caliper 114 by bolts (not shown). A stator 122 of the electric motor 11 is fixed to an inner surface of the housing 120. The stator 122 has metal-made cores 124, and coils 126 wound on the cores 124. Permanent magnets 128 are provided facing the stator 122, with a small distance being left therebetween. The permanent magnets 128 are fixed to a nut 130 of the ball screw 118. Together with the nut 130, the permanent magnets 128 form a rotor of the electric motor 11.

The nut 130 has a cylindrical shape with a through-hole. The nut 130 has a small-diameter portion 130a that is rotatably supported to the closure portion 120b of the housing 120 via a radial bearing 132, and a large-diameter portion 130b that is supported to the caliper 114 via a radial thrust bearing 134 in such a manner that the large-diameter portion 130b is rotatable and unmovable in the directions of the axis. The permanent magnets 128 are fixed to an outer peripheral portion between the large-diameter portion 130b and the small-diameter portion 130a of the nut 130. A ball groove for retaining balls of the ball screw 118 is formed in an inner peripheral surface of the nut 130 at a constant pitch. The nut 130 also has a tube (not shown) that forms a ball path extending from a suitable site in the ball screw to another site in the ball screw.

Permanent magnets 136 are equidistantly disposed on and fixed to an outer peripheral portion of the nut 130 in a pattern in which the N-pole and the S-pole alternate. A position sensor 12 formed by a Hall element is fixed to the caliper 114 in such a manner as to face the permanent magnets 136. The position sensor 12 detects a relative position X of the inner pad 110, a braking member, to the electric motor 11 by detecting rotation of the nut 130 based on changes of magnetic field caused by rotation of the permanent magnets 136.

The pressurizing member 116 includes an integrally-formed screw shaft 138 that extends through an interior of the nut 130. An outer peripheral surface of the screw shaft 138 has a ball groove of the ball screw 118 with a predetermined lead angle. The ball groove formed in the outer peripheral surface of the screw shaft 138, the ball groove formed in the inner peripheral surface of the nut 130, and the aforementioned tube form a ball circulating path of the ball screw. The ball screw 118 is of a well-known type having a construction in which a plurality of balls 140 are contained closely in a line in the circulating path. Although in the embodiment, the ball circulating path of the ball screw 118 is of a tube type, the ball circulating path may be of a generally-termed deflector type.

Due to this construction, if the nut 130 is forwardly rotated (rotated in a predetermined direction) by the electric motor 11, the screw shaft 138 is moved in the rightward direction in FIG. 2 due to the operation of the ball screw 118. Therefore, the pressurizing member 116 pushes the inner pad 110, that is, a braking member, toward the disc rotor 102. As a result, the inner pad 110 is pressed against the disc rotor 102.

A pressurizing force sensor 13, that is, a strain sensor, is embedded in a surface of the pressurizing member 116 that contacts the inner pad 110. The pressurizing force sensor 13 is designed to detect an actual pressurizing force (actual pressurizing force P) that the pressurizing member 116 exerts on the inner pad 110, from the amount of strain that occurs in the pressurizing member 116.

Referring back to FIG. 1, the electric control device 20 includes a microcomputer 21 that has a memory and a CPU (which are not shown). The electric control device 20 executes programs stored in the memory. The electric control device 20 is connected with the microcomputer 21, the pressurizing force sensor 13, a vehicle speed sensor 41, a parking brake operating switch 42, a depressing force sensor 43, a stroke sensor 44, a motor current sensor 45, and wheel speed sensors 46a–46d. The electric control device 20 inputs signals from these sensors and the like. The vehicle speed sensor 41 detects a speed of the vehicle (hereinafter, referred to as "vehicle speed") SPD by detecting rotation of an output shaft of a transmission (not shown). The parking brake operating switch 42 generates a parking brake operation command signal PKB, when operated by an operating person in order to control the operation of the parking brake. The depressing force sensor 43 detects a pedal depressing force F exerted on the brake pedal 50 by an operating person, as a vehicle state quantity detecting means. The stroke sensor 44, as a vehicle state quantity detecting means, detects an operation stroke ST of the brake pedal 50. The wheel speed sensors 46a to 46d, as a vehicle state quantity detecting means, are provided for the four wheels FR, FL, RR, RL, respectively, and detect the wheel speeds VFR, VFL, VRR, VRL of the wheels. The motor current sensor 45 detects an actual supply current I actually supplied to the electric motor 11 (a value obtained considering the duty ratio).

The drive circuit 30 is a switching circuit that is connected at its input side to the electric control device 20, and that is connected at its output side to the electric motor 11, and that is connected to a battery (not shown) of the vehicle provided as an electric power source. The drive circuit 30 supplies each electric motor 11 with a current corresponding to a duty ratio-indicating command signal from the electric control device 20 (the command signal containing a direction of the current). The aforementioned motor current sensor 45 is connected to current supplying lines from the drive circuit 30 to the electric motors.

Figure 3:
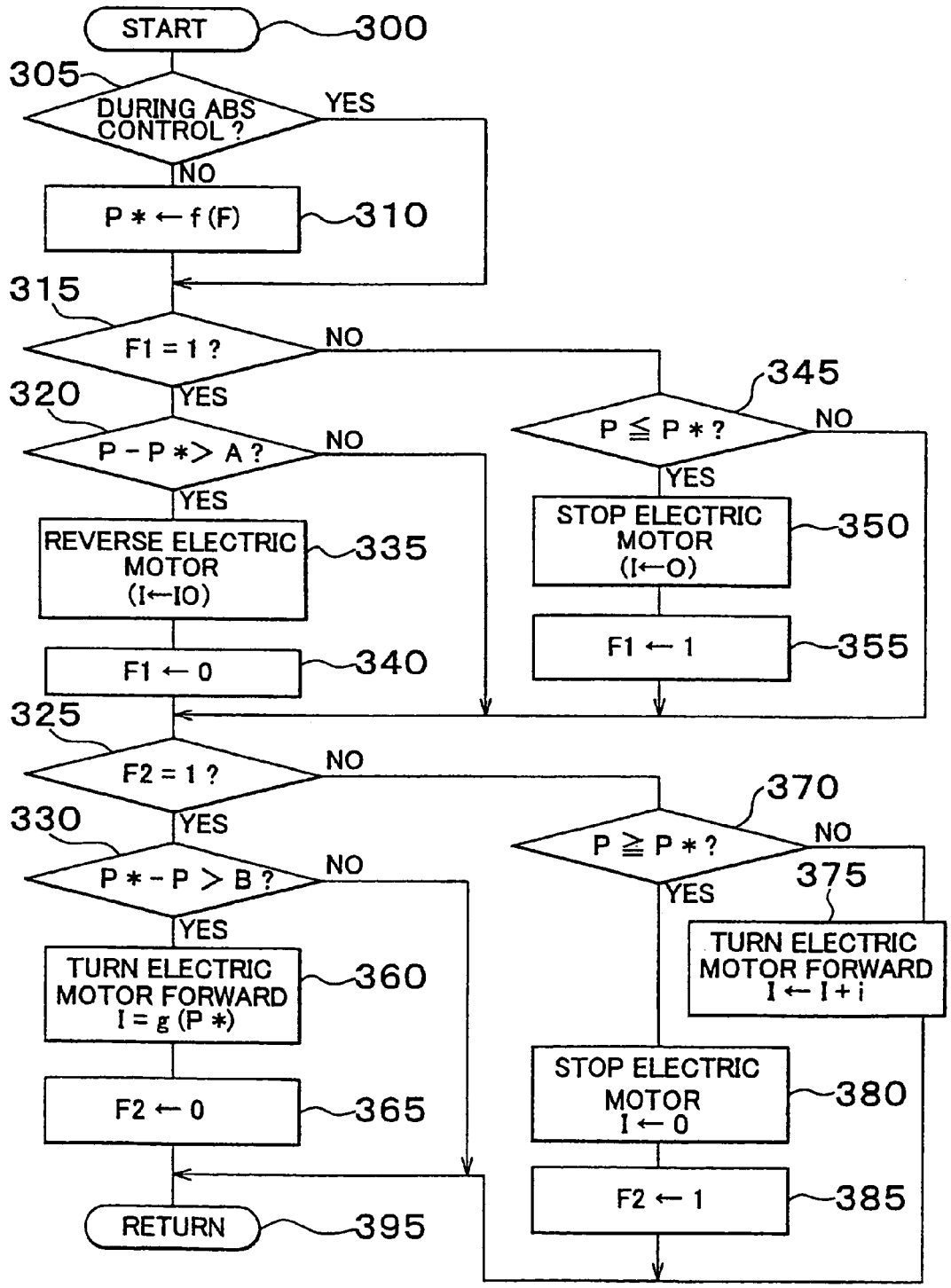
FIG. 3 is a flowchart illustrating a main routine (program) executed by a microcomputer shown in FIG. 1.
Figure 4:
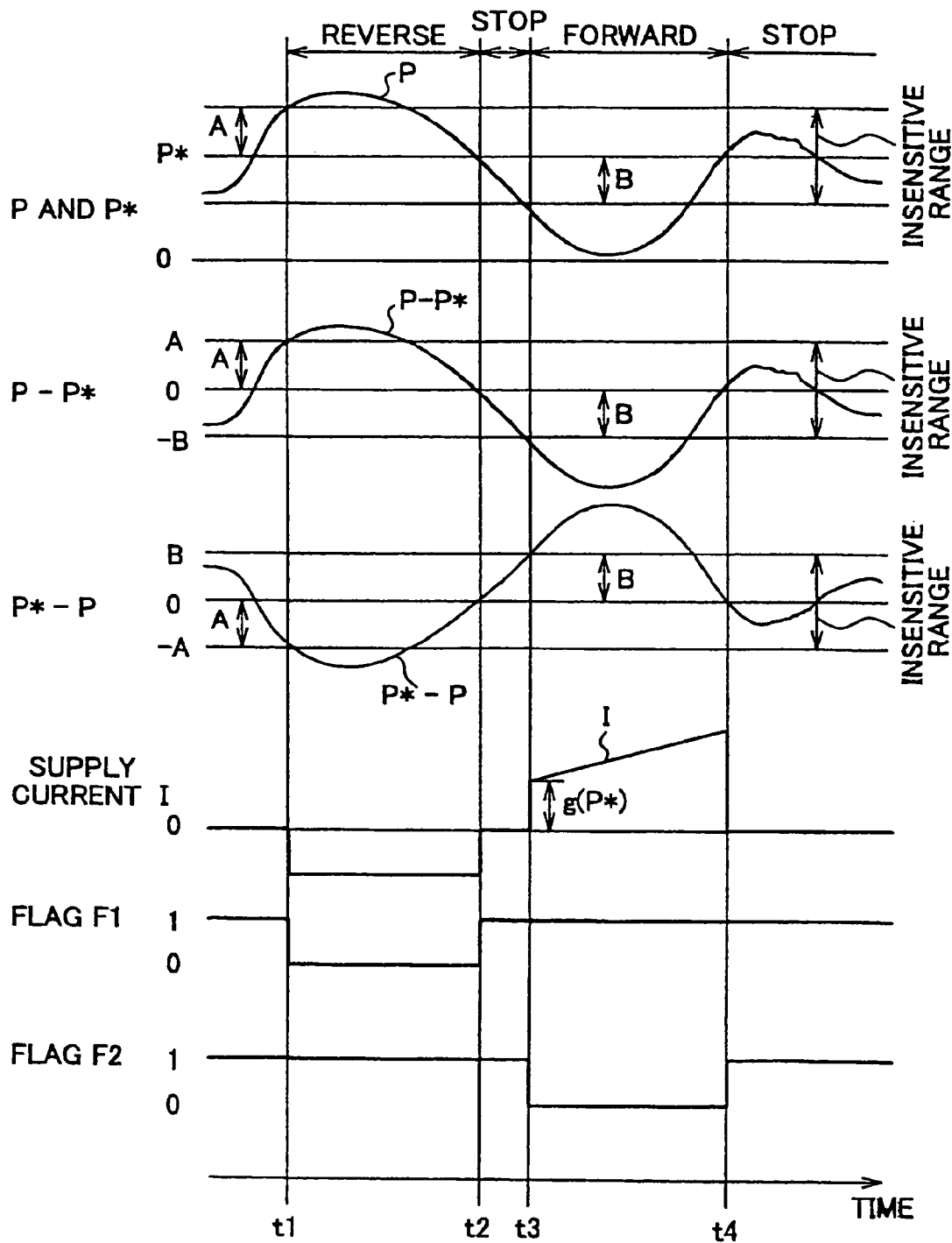
FIG. 4 is a time chart indicating changes in the target pressurizing force, the actual pressurizing force, the supply current to the electric motor, and flags F2, F2 in the first embodiment.
Figure 5A:
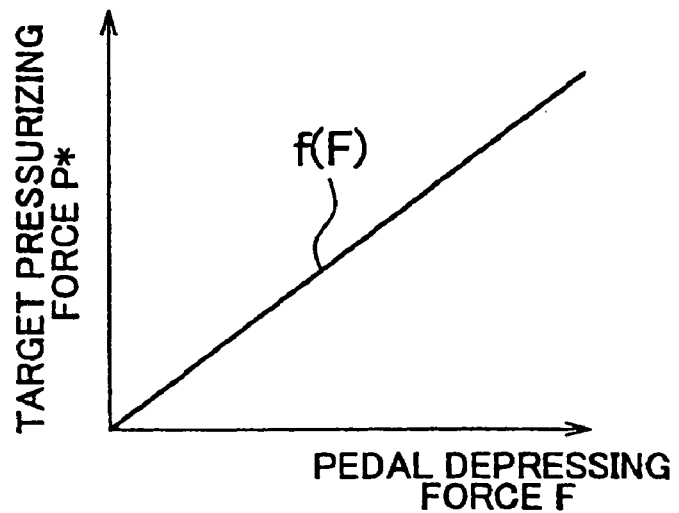
FIG. 5A indicates a map stored in a memory to which the microcomputer shown in FIG. 1 refers.
Figure 5B:
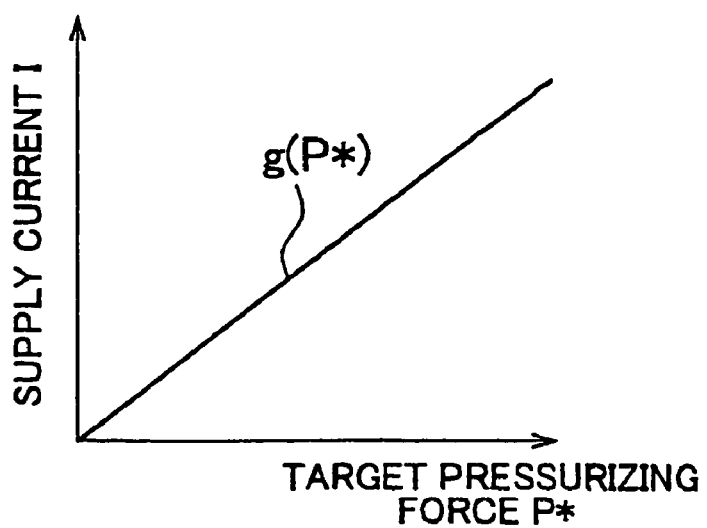
FIG. 5B indicates a map stored in a memory which the microcomputer shown in FIG. 1 refers to and which prescribes a relationship between the target pressurizing force and the supply current to the electric motor.

Next, operation of the control apparatus for the aforementioned vehicular brake will be described. FIG. 3 is a flowchart illustrating a program (main routine) that is executed by the microcomputer 21 for a brake control (a control of the actual pressurizing force P detected by the pressurizing force sensor 13), at every elapse of a predetermined time. FIG. 4 is a time chart in which the target pressurizing force P*, the actual pressurizing force P, the current I supplied to each electric motor 11, and the values of flags F1, F2 described below are indicated in accordance with elapse of time. In general, the target pressurizing force P* first changes, and the actual pressurizing force P then changes so as to follow the changes in the target pressurizing force P*. For an easier description, FIG. 4 indicates a case where the target pressurizing force P* is constant and the actual pressurizing force P changes due to an inertia that occurs on the nut 130 after the current supply to the electric motor 11 is discontinued, vibrations from a road surface, and other factors. FIG. 4 indicates a state in which the brake pedal is depressed, and the actual pressurizing force P becomes substantially equal to the target pressurizing force P*. FIGS. 5A and 5B show maps stored in the memory the microcomputer 21 refers to.

Firstly described will be a case where an ordinary brake control (a pressurizing force control in an ordinary occasion) is being performed, that is, where an antilock brake control (hereinafter, referred to as "ABS control") that is performed if a wheel is locked is not being performed, and where a present state is a state immediately prior to a time t1 indicated in FIG. 4, that is, a state in which the electric motor 11 is not rotated and the actual pressurizing force P is in a vicinity of the target pressurizing force P* (below-described threshold-B<P-P*<below-described threshold A). The microcomputer 21 starts, at a predetermined timing, the process of a brake control from step 300 in the routine illustrated in FIG. 3, and then proceeds to step 305, in which the microcomputer 21 determines whether the ABS control is being executed. Since the ABS control is not being executed at the present stage, the microcomputer 21 makes determination of "NO" in step 305, and then proceeds to step 310. In step 310, the microcomputer 21 determines a present target pressurizing force P* from a map that indicates a relationship between the pedal depressing force F and the target pressurizing force P* and an actual pedal depressing force F detected by the depressing force sensor 43.

Next, the microcomputer 21 proceeds to step 315, in which the microcomputer 21 determines whether the value of a flag F1 is "1". The value of the flag F1 is set to "0" if the electric motor 11 is being reversed. Otherwise, that is, if the electric motor 11 is being forwardly operated, or at a rest, the value of the flag F1 is set to "1". Since the electric motor 11 is not being reversed at a time point immediately before the time t1, the value of the flag F1 is "1". Therefore, the microcomputer 21 makes determination of "Yes" in step 315, and then proceeds to step 320. In step 320, the microcomputer 21 determines whether a difference (P-P*) between an actual pressurizing force P detected by the pressurizing force sensor 13 and the target pressurizing force P* is greater than a predetermined threshold A (A is a positive value). Since the present time point is immediately before the time t1, the difference between the actual pressurizing force P and the target pressurizing force P* is smaller than the predetermined threshold A. Therefore, the microcomputer 21 makes determination of "No" in step 320, and then proceeds to step 325.

In step 325, the microcomputer 21 determines whether the value of a flag F2 is "1". The value of the flag F2 is set to "0" if the electric motor 11 is being forwardly operated. Otherwise, that is, if the electric motor 11 is being reversed or at a rest, the value of the flag F2 is set to "1". Since the electric motor 11 is not being forwardly operated at a time point immediately before the time t1, the value of the flag F2 is "1". Therefore, the microcomputer 21 makes determination of "Yes" in step 325, and then proceeds to step 330. In step 330, the microcomputer 21 determines whether a difference (P*-P) between the target pressurizing force P* and the actual pressurizing force P is greater than a predetermined threshold B (B is a positive value). Since the present time point is immediately before the time t1, the difference (P*-P) between the target pressurizing force P* and the actual pressurizing force P is smaller than the predetermined threshold B. Therefore, the microcomputer 21 makes determination of "No" in step 330, and then proceeds to step 395. In step 395, the microcomputer 21 temporarily ends the routine.

Thus, in a case where an electric motor is not supplied with electric current and therefore is not rotated forwardly or reversely, and where the difference (P-P*) between the actual pressurizing force P and the target pressurizing force P* is between the threshold -B and the threshold A, the microcomputer 21 does not start supplying current to the electric motor 11, so that the electric motor 11 is not rotated.

Next described will be a case where the difference between the actual pressurizing force P and the target pressurizing force P* becomes greater than the threshold A (see the time t1) If in this case, the microcomputer 21 starts, at a predetermined timing, the process of the routine illustrated in FIG. 3, the microcomputer 21 executes steps 305, 310, 315, and then in the subsequent step 320 makes determination of "Yes", and then proceeds to step 335. In step 335, the microcomputer 21 sets the current I to be supplied to the electric motor 11 to a predetermined negative value (-I0). Therefore, by an electric motor driving routine (not shown), the current -I0 is supplied to the electric motor 11, so that the electric motor 11 is reversed. Subsequently in step 340, the microcomputer 21 sets the value of the flag F1 to "0".

Next, the microcomputer 21 proceeds to step 325. Since the value of the flag F2 is still "1", the microcomputer 21 makes determination of "Yes" in step 325. Then, since the difference (P*-P) between the target pressurizing force P* and the actual pressurizing force P is smaller than the threshold B, the microcomputer 21 makes determination of "No" in step 330, and then proceeds to step 395. In step 395, the microcomputer 21 temporarily ends the routine.

Thus, if the actual pressurizing force P becomes greater than the value obtained by adding the threshold A to the target pressurizing force P*, the microcomputer 21 reverses the electric motor 11 to decrease the actual pressurizing force P, so that the actual pressurizing force P is brought closer to the actual pressurizing force P.

If the electric motor 11 is reversed by supplying it with the current -I0, the load applied to the electric motor 11 is very small in comparison with the load applied when the electric motor 11 is forwardly rotated. When the electric motor 11 is forwardly rotated, there is a need to press the brake pads 108, 110, that is, braking members, against the disc rotor 102, that is, a braked member, by using the pressurizing member 116. However, when the electric motor 11 is reversed, there is no such need. Therefore, with the constant current -I0 supplied, the electric motor 11 continues reversely turning, so that the actual pressurizing force P continues decreasing. However, during a period up to a time point t2, the actual pressurizing force P is greater than the target pressurizing force P*.

If during this state, the microcomputer 21 executes the routine illustrated in FIG. 3, the microcomputer 21 makes determination of "No" in step 315 subsequent to steps 305, 310 since the value of the flag F1 has been set to "0" by step 340 in the previous cycle. Then the microcomputer 21 proceeds to step 345, in which the microcomputer 21 determines whether the actual pressurizing force P has become equal to or less than the target pressurizing force P*. As described above, the actual pressurizing force P is greater than the target pressurizing force P* at the present time. Therefore, the microcomputer 21 makes determination of "No" in step 345. Subsequently, the microcomputer 21 proceeds to steps 325, 330, and then to step 395, in which the microcomputer 21 temporarily ends the routine. As a result, the electric motor 11 continues reversely turning, and the actual pressurizing force P further decreases.

Therefore, when the time t2 is reached, the actual pressurizing force P becomes equal to the target pressurizing force P*. Hence, if the microcomputer 21 executes the routine illustrated in FIG. 3 at the time t2 or immediately thereafter, the microcomputer 21 makes determination of "Yes" in step 345 subsequent to steps 305, 310, 315, and then proceeds to step 350. In step 350, the microcomputer 21 sets the supply current I to the electric motor 11 to "0", thereby stopping the reverse operation of the electric motor 11. Subsequently in step 355, the microcomputer 21 sets the value of the flag F1 to "1". The microcomputer 21 then proceeds to steps 325, 330, and to step 395, in which the microcomputer 21 temporarily ends the routine.

As described above, the electric motor 11 is reversed when the difference (P−P*) between the actual pressurizing force P and the target pressurizing force P* becomes greater than the threshold A. The reverse operation of the electric motor 11 is stopped when the actual pressurizing force P becomes equal to or less than the target pressurizing force P*. Taking the inertia of each electric motor 11 into account, it is also practicable to adopt a construction in which the reverse operation of an electric motor 11 is stopped when the difference (P−P*) between the actual pressurizing force P and the target pressurizing force P* becomes equal to a predetermined threshold that is within the range of "0" to the threshold A.

During a period from the time t2 to a time t3, the actual pressurizing force P is smaller than the target pressurizing force P*, but is in a vicinity of the target pressurizing force P*, so that the difference (P*−P) between the target pressurizing force P* and the actual pressurizing force P is smaller than the predetermined threshold B. In this state, the microcomputer 21 proceeds to steps 305, 310, 315, 320. In step 320, the microcomputer 21 makes determination of "No". Then, the microcomputer 21 proceeds to step 325.

Since the value of the flag F2 is "1", the microcomputer 21 makes determination of "Yes" in step 325, and then proceeds to step 330. In step 330, the difference (P*−P) between the target pressurizing force P* and the actual pressurizing force P is smaller than the predetermined threshold B, the microcomputer 21 makes determination of "No". Then, the microcomputer 21 proceeds to step 395, in which the microcomputer 21 temporarily ends the routine.

Thus, if the difference (P*−P) between the target pressurizing force P* and the actual pressurizing force P is smaller than the threshold B, no current is supplied to the electric motor 11, so that the electric motor 11 is kept in stopped state.

Next described will be a case where the difference (P*−P) between the target pressurizing force P* and the actual pressurizing force P becomes greater than the threshold B (see the time t3). In this case, the microcomputer 21 proceeds to steps 305, 310, 315, 320, 325, 330. In step 330, the microcomputer 21 makes a determination of "Yes". The microcomputer 21 then proceeds to step 360.

In step 360, the microcomputer 21 determines a supply current I from a map that indicates a relationship between the target pressurizing force P* and the current I as indicated in FIG. 5B and a target pressurizing force P* at the present time. As a result, by an electric motor driving routine (not shown), the current I=g (P*) is supplied to the electric motor 11, so that the electric motor 11 is forwardly operated to increase the actual pressurizing force P. Next, the microcomputer 21 sets the value of the flag F2 to "0" in step 365, and then proceeds to step 395, in which the microcomputer 21 temporarily ends the routine.

From this time point on, when the microcomputer 21 executes the program illustrated in FIG. 3, the microcomputer 21 proceeds to steps 305, 310, 315, 320, 325. In this case, the value of the flag F2 has been set to "0" by step 365 in the previous cycle, the microcomputer 21 makes determination of "No" in step 325, and then proceeds to step 370. In step 370, the microcomputer 21 determines whether the actual pressurizing force P has become equal to or greater than the target pressurizing force P*. Since at the present time, the forward operation of the electric motor 11 has just started, the actual pressurizing force P is smaller than the target pressurizing force P*. Therefore, the microcomputer 21 makes determination of "No" in step 370, and then proceeds to step 375. In step 375, the microcomputer 21 increases the supply current I to the electric motor 11 by a predetermined current i. After that, the microcomputer 21 proceeds to step 395, in which the microcomputer 21 temporarily ends the routine.

Therefore, when the electric motor driving routine (not shown) is executed, the current I increased by the predetermined current i is supplied to the electric motor 11, so that the supply current I continues increasing between t1 and t4 as indicated in FIG. 4. As a result, the rotating torque in the direction of forward operation of the electric motor 11 is increased, so that the actual pressurizing force P further increases. Thus, the actual pressurizing force P gradually increases. The aforementioned step 375 is repeated until the time t4 when the actual pressurizing force P becomes equal to or greater than the target pressurizing force P*.

Next described will be a case where the actual pressurizing force P becomes equal to or greater than the target pressurizing force P* while the electric motor 11 is being forwardly rotated (see the time t4). In this case, the microcomputer 21 proceeds to steps 305, 310, 315, 320, 325, 370. In step 370, the microcomputer 21 makes determination of "Yes". The microcomputer 21 then proceeds to step 380. In step 380, the microcomputer 21 sets the value of the supply current I to the electric motor 11 to "0" so as to stop the forward turning of the electric motor 11. After setting the value of the flag F2 to "1", the microcomputer 21 proceeds to step 395, in which the microcomputer 21 temporarily ends the routine.

Thus, each electric motor 11 is forwardly rotated when the difference (P*−P) between the target pressurizing force P* and the actual pressurizing force P becomes greater than the threshold B. The forward operation of the electric motor 11 is stopped when the actual pressurizing force P becomes equal to the target pressurizing force P*. Taking the inertia of each electric motor 11 into account, it is also practicable to adopt a construction in which the forward operation of an electric motor 11 is stopped when the difference (P*−P) between the target pressurizing force P* and the actual pressurizing force P becomes equal to a predetermined threshold that is within the range of "0" to the threshold B.

If the difference (P−P*) between the actual pressurizing force P and the target pressurizing force P* is within the range of the threshold −B to the threshold A as in the case subsequent to the time t4, the microcomputer 21 executes steps 305, 310, 315, 320, 325, 330, and then temporarily ends the routine in step 395, as in the case prior to the time t1. Therefore, the electric motor 11 is not rotated.

The above-described control is the pressurizing force control in an ordinary occasion in accordance with this embodiment. In this embodiment, if the difference (P−P*) between the actual pressurizing force P and the target pressurizing force P* is within the range of the threshold −B to the threshold A (control insensitive range), operation of the electric motor 11 is prohibited. Therefore, frequent repetitions of forward and reverse operations of an electric motor can be avoided. As a result, the service life of the electric motor 11 can be increased, and unnecessary energy consumption is eliminated, and noises can be reduced. Although in the embodiment, the supply current to an electric motor 11 is gradually increased between the time t3 and the time t4, it is also possible to adopt a construction in which a PID control or the like is employed so that the value of current can be varied in accordance with the difference between the target pressurizing force P* and the actual pressurizing force P, and in which the supply current is increased until the difference between the target pressurizing force P* and the actual pressurizing force P becomes minimum, and after that, the supply current is decreased.

Next, operation in the ABS control will be described with reference to FIG. 3 and FIGS. 6 to 11. The microcomputer 21 executes an ABS control for the rear left wheel RL illustrated in FIG. 6 at every elapse of a predetermined time ΔTa, in addition to the main routine illustrated in FIG. 3. The microcomputer 21 also executes a routine similar to that illustrated in FIG. 6 with respect to each of the rear right wheel RR and the front right and left wheels FR, FL at every elapse of the predetermined time ΔTa.

Firstly, description will be made in conjunction with a case as indicated by the range of a time t10 to a time t11 in FIG. 11 where the brake pedal 50 starts to be depressed and where the wheel is not in a locked state and the ABS control is not being executed. During the aforementioned period, a target pressurizing force P* is determined in accordance with the pedal depressing force F by executing the main routine illustrated in FIG. 3 (step 310). Thus, the electric motor 11 is driven so that the actual pressurizing force P becomes equal to the determined target pressurizing force P*.

At a predetermined timing, the microcomputer 21 starts the process of the ABS control routine at step 600. In step 605, the microcomputer 21 calculates an actual slip rate S as a quantity of state of the vehicle in accordance with a calculation expression presented below as Expression 1. In the Expression 1, VS is the vehicle body speed, and VW is the wheel speed. Since the object of the ABS control is the rear left wheel RL, the wheel speed VW is the rear-left wheel speed VRL. In the ABS control with respect to a different wheel, the wheel speed VW is the wheel speed VRR, VFR, VFL of the corresponding object wheel. If no braking force is acting on the wheel, VW=VS and therefore S=0, as can be understood from Expression 1. If the wheel is completely locked, VW=0 and therefore S=1.

$$S=(VS-VW)/VS \qquad \text{Expression 1}$$

The vehicle body speed VS is determined by Expression 2 below, where VWmax is the maximum value of the wheel speeds VFR, VFL, VRR, VRL detected by the wheel speed sensors 46a–46d, and VS0 is the vehicle body speed determined during the previous execution of the routine, and αu and αd are predetermined positive constants. Furthermore, in Expression 2, MED is a function that selects a variable of an intermediate magnitude from the variables provided in the parentheses.

$$VS=MED(VW\max, VS0+\alpha u \cdot \Delta Ta, VS0-\alpha d \cdot \Delta Ta) \qquad \text{Expression 2}$$

Next, the microcomputer 21 proceeds to step 610, in which the microcomputer 21 calculates a difference e in accordance with Expression 3. In Expression 3, S* is the target slip rate, which is a constant value (e.g., 0.2) although it depends on the road surface.

$$e=S^*-S \qquad \text{Expression 3}$$

The microcomputer 21 then proceeds to step 615, in which the microcomputer 21 determines whether the ABS control has ended. Since the ABS control is not being executed at the present time, the microcomputer 21 makes determination of "Yes" in step 615, and proceeds to step 620. In step 620, the microcomputer 21 determines whether the difference e is less than a first reference difference −e1 (e1 is a positive value). The value −e1 indicates a state where there is a possibility of the locking of the wheel. Since the wheel is not in a locked state at the present time, the difference e is greater that the first reference difference −e1 as indicated in FIG. 11, and therefore the microcomputer 21 makes determination of "No" in step 620. Subsequently in step 695, the microcomputer 21 temporarily ends the routine. In this case, therefore, the ABS control is not started.

Next described will be case where the wheel becomes locked at the time point t11. When the microcomputer 21 first proceeds to step 615 after the time point t11, the ABS control is not started yet. Therefore, the microcomputer 21 makes determination of "Yes" in step 615, and then proceeds to step 620. Since the wheel is in a locked state in this case, the difference e is less than the first reference difference −e1. Therefore, the microcomputer 21 makes determination of "Yes" in step 620, and proceeds to step 625. In step 625, the microcomputer 21 stores the present actual pressurizing force P detected by the pressurizing force sensor 13 (which may be replaced by the present target pressurizing force P* determined by the depressing force sensor 43) as an initial pressurizing force PM into a memory. After that, the microcomputer 21 proceeds to step 630, in which the microcomputer 21 starts to execute a rapid reduction-mode sub-routine illustrated in FIG. 7 in order to start a rapid reduction mode. Subsequently, the microcomputer 21 proceeds to step 695, in which the microcomputer 21 temporarily ends the ABS routine. Thus, the ABS control is started. The aforementioned initial pressurizing force PM is used in step 665 described below. Furthermore, since S*−S=−e1 is a condition that indicates a state where the wheel is likely to be locked, the initial pressurizing force PM represents a pressurizing force that causes the state where the wheel is likely to be locked.

Figure 7:
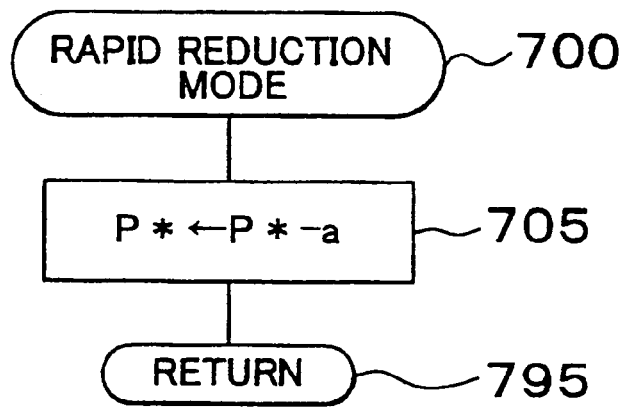
FIG. 7 is a flowchart illustrating a rapid reduction-mode sub-routine (program) executed by the microcomputer shown in FIG. 1.

Upon starting execution of the rapid reduction-mode sub-routine of rapid reducing the target pressurizing force indicated in FIG. 7, the microcomputer 21 repeats execution of the rapid reduction-mode sub-routine at every elapse of a predetermined time ΔTb. In the rapid reduction-mode sub-routine, the microcomputer 21 proceeds to step 705 via step 700. In step 705, the microcomputer 21 sets a value obtained by subtracting a predetermined positive value a from the present target pressurizing force P* as a new target pressurizing force P*.

During the ABS control, as well, the microcomputer 21 starts executing the main routine illustrated in FIG. 3 at a predetermined timing, and determines in step 305 whether the ABS control is being executed. Since the ABS control is being executed in this case, the microcomputer 21 makes determination of "Yes", and proceeds to step 315. Thus, step 310 is not executed. Therefore, the target pressurizing force P* does not become a target pressurizing force P* determined in accordance with the predetermined in step 310, but becomes a target pressurizing force P* determined in step 705 in the rapid reduction-mode sub-routine. Subsequently, in order to execute a process starting at step 315, the microcomputer 21 controls the supply current I to the electric motor 11 so that the actual pressurizing force P becomes equal to the target pressurizing force P* determined as described above. The control will be described in detail later.

When the rapid reduction mode is thus started, the actual pressurizing force P is reduced by the positive value a at every elapse of the predetermined ΔTb, and the electric motor 11 is correspondingly driven (reversely) to reduce the actual pressurizing force P, so that the braking torque rapidly decreases. The setting of the target pressurizing force P*, and the control of the supply current I to the electric motor 11 for the purpose of bringing the actual pressurizing force P equal to the target pressurizing force P* (FIG. 3) are similarly performed in other ABS control modes (a gentle reduction mode, a rapid increase mode, and a gentle increase mode).

If during this state, the microcomputer 21 starts the process of the ABS control routine of FIG. 6 again at step 600, the microcomputer 21 updates the actual slip rate S in step 605, and updates the difference e in step 610. Since the presently selected mode is the rapid reduction mode and the ABS control is being executed, the microcomputer 21 makes determination of "No" in step 615, and proceeds to step 635. In step 635, the microcomputer 21 determines whether the present mode is the rapid reduction mode. Since the present mode is the rapid reduction mode, the microcomputer 21 makes determination of "Yes" in step 635, and proceeds to step 640. In step 640, the microcomputer 21 determines whether the difference e is greater than a second reference difference −e2 (e2 is a positive value that is less than e1 as indicated in FIG. 11). The value −e2 is a value that indicates that the possibility of the locking of the wheel has disappeared. In this case, the rapid reduction of the braking torque has just started, and the wheel has not recovered from the locked state yet. Therefore, the difference e is smaller than the second reference difference −e2. Hence, the microcomputer 21 makes determination of "No" in step 640, and proceeds to step 695, in which the microcomputer 21 temporarily ends the routine.

If the above-described state continues, step 705 in FIG. 7 is repeatedly executed, so that the target pressurizing force P* rapidly decreases. As a result, the braking torque rapidly decreases, and the wheel speed VRL recovers (increases). Therefore, the actual slip rate S becomes closer to the target slip rate S*, and the difference e becomes greater than the second reference difference −e2 as indicated at a time t12 in FIG. 11. Therefore, when the microcomputer 21 proceeds to step 640 at a predetermined timing, the microcomputer 21 makes determination of "Yes" in step 640. The microcomputer 21 subsequently proceeds to step 645. In step 645, the microcomputer 21 starts to execute a gentle reduction-mode sub-routine illustrated in FIG. 8, in order to start the gentle reduction mode in which the target pressurizing force P* is gently reduced. As is the case with the rapid reduction-mode sub-routine, the microcomputer 21, after starting execution of the gentle reduction-mode sub-routine, repeats execution of the gentle reduction-mode sub-routine at every elapse of the predetermined time ΔTb until execution of a different mode sub-routine is started.

In the gentle reduction-mode sub-routine, the microcomputer 21 proceeds to step 805 via step 800. In step 805, the microcomputer 21 sets a value obtained by subtracting a predetermined positive value b from the present target pressurizing force P* as a new target pressurizing force P*. The predetermined positive value b is a value that is less than the aforementioned predetermined positive value a.

Therefore, when the main routine illustrated in FIG. 3 is executed, the electric motor 11 is driven (reversely) in accordance with the target pressurizing force P* reduced by the predetermined positive value b, so that the braking torque (actual pressurizing force P) is reduced by a torque corresponding to the positive value b.

Figure 6:
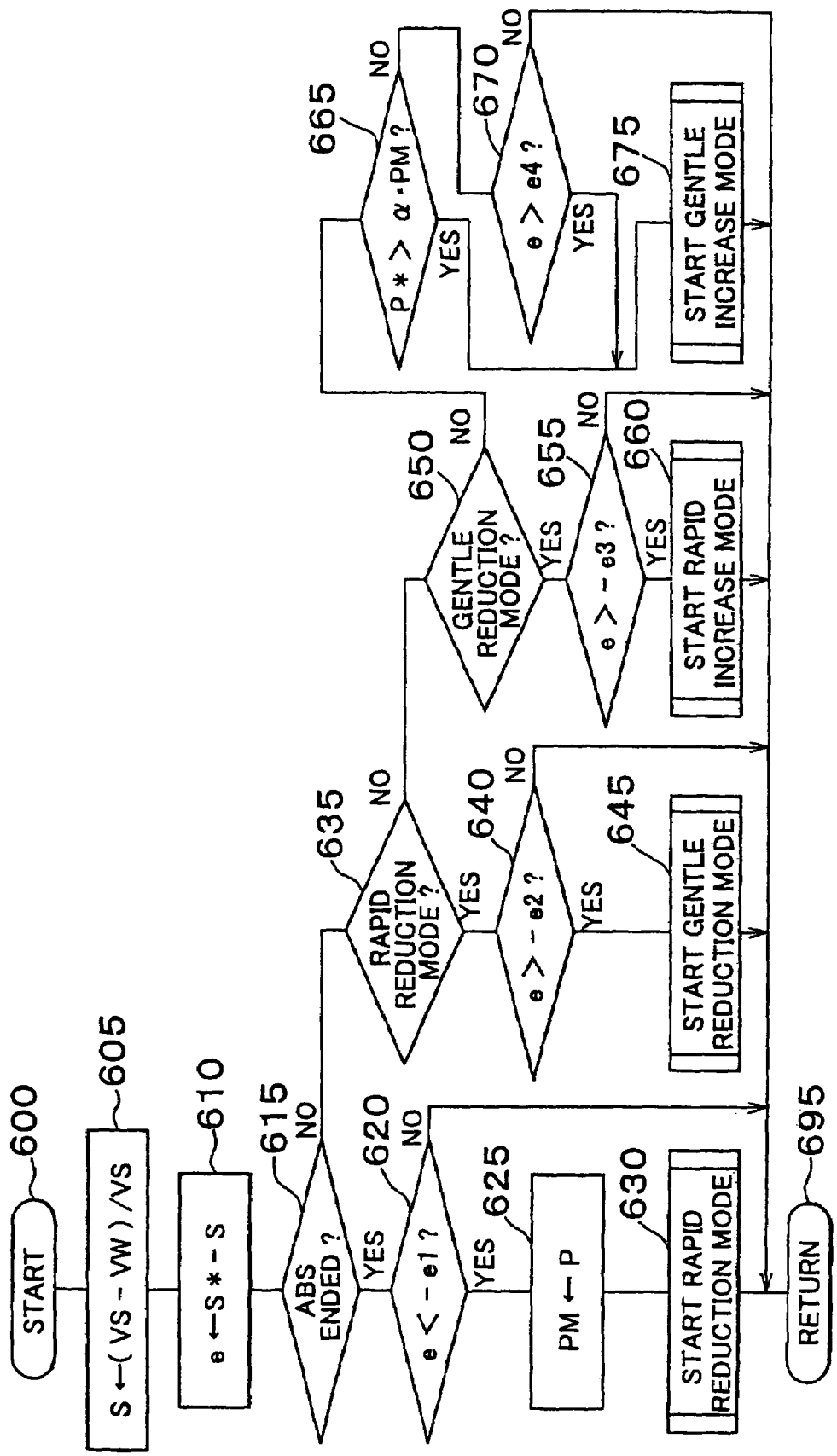
FIG. 6 is a flowchart illustrating an ABS control routine (program) executed by the microcomputer shown in FIG. 1.

When during this state, the ABS control of FIG. 6 is started, the microcomputer 21 executes steps 605, 610. Since the present mode is the gentle reduction mode, the microcomputer 21 makes determination of "No" in steps 615 and 635, and proceeds to step 650. In step 650, the microcomputer 21 determines whether the present mode is the gentle reduction mode. The microcomputer 21 makes determination of "Yes" in step 650, and proceeds to step 655. In step 655, the microcomputer 21 determines whether the difference e is greater than a third reference difference −e3 (e3 is a positive value that is less than e2 as indicated in FIG. 11). Since the gentle reduction mode has just been started, the difference e is less than the third reference difference −e3 (e<−e3), the microcomputer 21 makes determination of "No" in step 655, and proceeds to step 695, in which the microcomputer 21 temporarily ends the routine.

Figure 8:
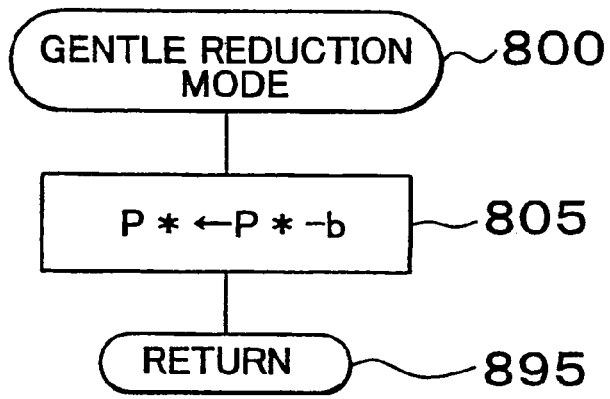
FIG. 8 is a flowchart illustrating a gentle reduction-mode sub-routine (program) executed by the microcomputer shown in FIG. 1.

If the aforementioned state continues, step 805 in FIG. 8 is repeatedly executed, so that the target pressurizing force P* is gently reduced (by the value b at every elapse of the predetermined time ΔTb). As a result, the braking torque is gradually reduced, and the wheel speed VRL is further recovered. Therefore, the actual slip rate S approaches the target slip rate S*, and the difference e becomes greater than the third reference difference −e3 as indicated at a time t13 in FIG. 11. Hence, when the microcomputer 21 proceeds to step 655 at a predetermined timing, the microcomputer 21 makes determination of "Yes" in step 655. The microcomputer 21 then proceeds to step 660, in which the microcomputer 21 starts to execute a rapid increase-mode sub-routine illustrated in FIG. 9, in order to start a rapid increase mode in which the target pressurizing force P* is rapidly increased. As is the case with the rapid reduction-mode and gentle reduction-mode sub-routines, the microcomputer 21, after starting executing the rapid increase-mode sub-routine, repeats execution of the rapid increase-mode sub-routine at every elapse of the predetermined time ΔTb until a different mode sub-routine is started.

In the rapid increase-mode sub-routine, the microcomputer 21 proceeds to step 905 via step 900. In step 905, the microcomputer 21 sets a value obtained by adding a predetermined positive value c to the present target pressurizing force P* as a new target pressurizing force P*. Then, the microcomputer 21 proceeds to step 995, in which the microcomputer 21 temporarily ends the routine. As for the predetermined positive value c, a value having substantially the same magnitude as the predetermined positive value a is selected. Therefore, when the main routine illustrated in FIG. 3 is executed, the electric motor 11 is driven (forward) in accordance with the target pressurizing force P* increased by the predetermined positive value c, so that the braking torque (actual pressurizing force P) is increased by a torque corresponding to the positive value c.

If during this state, the ABS control of FIG. 6 is started, the microcomputer 21 executes steps 605, 610. Since the present mode is the rapid increase mode, the microcomputer 21 makes determination of "No" in each of steps 615, 635 and 650, and then proceeds to step 665. In step 665, the microcomputer 21 determines whether the target pressurizing force P* has become greater than a multiplication product of a predetermined value α of the actual pressurizing force (initial pressurizing force) PM stored in the memory in step 625 multiplied by a predetermined value α (e.g., 0.8), that is, 0.8·PM. Since this stage is immediately after the rapid increase mode has been started, the target pressurizing force P* is less than α times the initial pressurizing force PM. Therefore, the microcomputer 21 makes determination of "No" in step 665, and proceeds to step 670. In step 670, the microcomputer 21 determines whether the difference e is greater than a fourth reference difference e4 (e4 is a positive value that is greater than e3 as indicated in FIG. 11). Since the braking torque rapid increase mode has just been started, the difference e is smaller than the fourth reference difference e4 at the present time. Therefore, the microcomputer 21 makes determination of "No" in step 670, and proceeds to step 695, in which the microcomputer 21 temporarily ends the routine. The value α may be determined from the reference value e4. It is also practicable to determine the reference value e4 from the predetermined value α.

Figure 9:
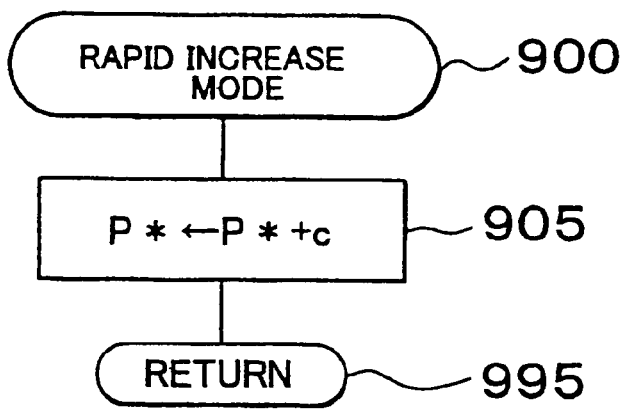
FIG. 9 is a flowchart illustrating a rapid increase-mode sub-routine (program) executed by the microcomputer shown in FIG. 1.

If this state continues, step 905 in FIG. 9 is repeatedly executed, so that the target pressurizing force P* rapidly increases (increases by an amount c at every elapse of the predetermined time ΔTb). As a result, the braking torque increases as well. If the target pressurizing force P* becomes greater than α times the initial pressurizing force PM before the difference e becomes greater than the fourth reference value e4 (see the time t14 in FIG. 11), the microcomputer 21 makes determination of "Yes" in step 665 in FIG. 6, to which the microcomputer 21 proceeds at a predetermined timing. The microcomputer 21 then proceeds to step 675, in which the microcomputer 21 starts executing a gentle increase-mode sub-routine illustrated in FIG. 10, in order to start a gentle increase mode.

Conversely, if in the rapid increase mode, the difference e becomes greater than the fourth reference value e4 before the target pressurizing force P* becomes greater than α times the initial pressurizing force PM (see time 14 in FIG. 11), the microcomputer 21 makes determination of "Yes" in step 670 in FIG. 6, to which the microcomputer 21 proceeds at a predetermined timing. The microcomputer 21 then proceeds to step 675, in which the microcomputer 21 starts executing the gentle increase-mode sub-routine illustrated in FIG. 10, in order to start the gentle increase mode. As in the rapid reduction-mode sub-routine and the like, the microcomputer 21, after starting the gentle increase-mode sub-routine, repeats execution of the gentle increase-mode sub-routine at every elapse of the predetermined time ΔTb.

In the gentle increase-mode sub-routine, the microcomputer 21 proceeds to step 1005 via step 1000. In step 1005, the microcomputer 21 sets a value obtained by adding a predetermined positive value d to the present target pressurizing force P* as a new target pressurizing force P*. The predetermined positive value d has a magnitude similar to that of the aforementioned predetermined positive value b, and is smaller than the aforementioned predetermined positive values a and c.

Subsequently in step 1010, the microcomputer 21 determines a provisional target pressurizing force P0* from the present pedal depressing force F and a map indicated in FIG. 5A. Subsequently in step 1015, the microcomputer 21 determines whether the target pressurizing force P* is greater than the provisional target pressurizing force P0*. Since the gentle increase mode has just been started at the present time, the target pressurizing force P* is normally smaller than the provisional target pressurizing force P0*. Therefore, the microcomputer 21 makes determination of "No" in step 1015, and proceeds to step 1095, in which the microcomputer 21 temporarily ends the routine.

Thus, when the main routine illustrated in FIG. 3 is executed, the electric motor 11 is driven (forward) in accordance with the target pressurizing force P* increased by the predetermined positive value c, so that the braking torque (actual pressurizing force P) is increased by a torque corresponding to the positive value d.

Figure 10:
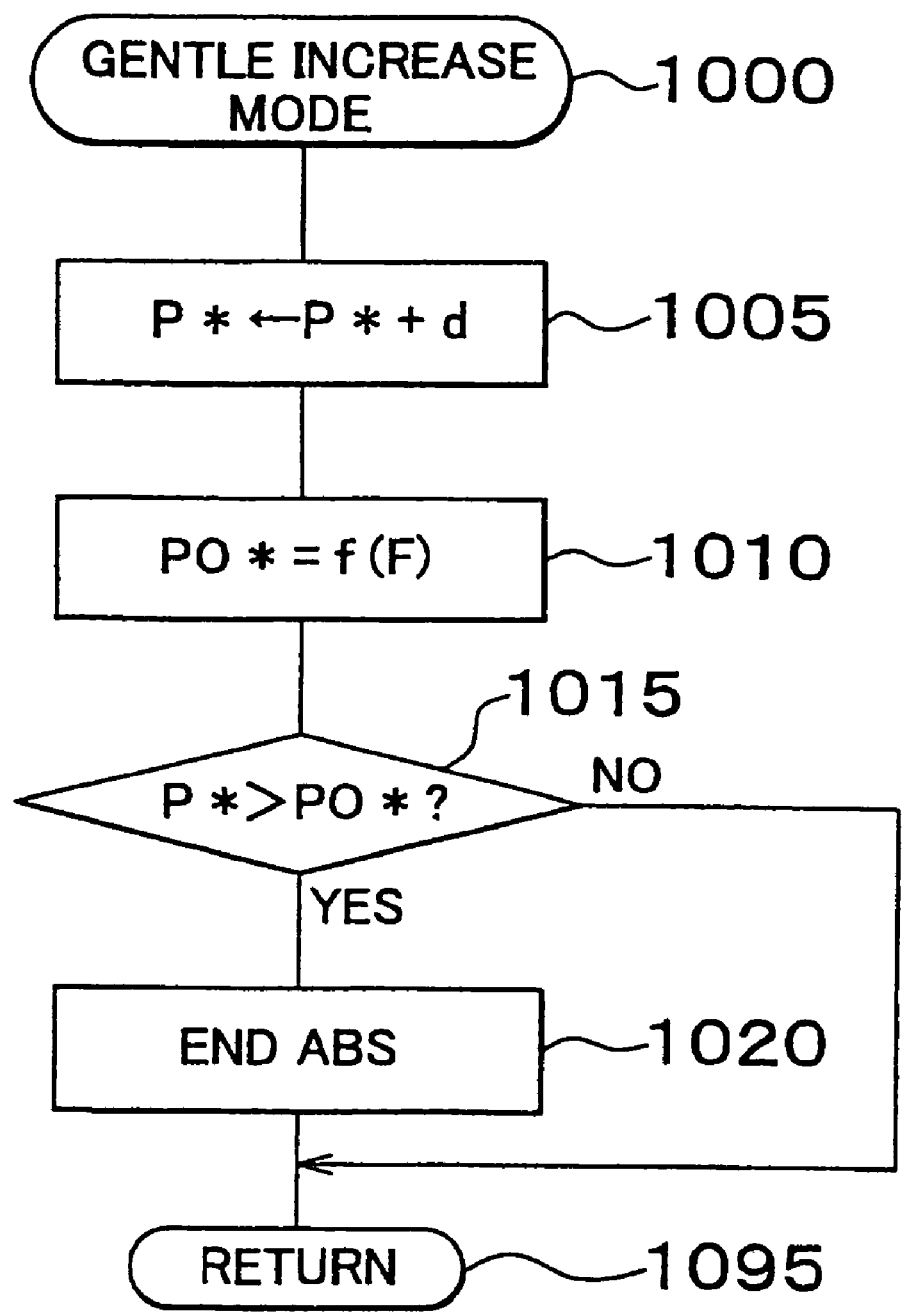
FIG. 10 is a flowchart illustrating a gentle increase-mode sub-routine (program) executed by the microcomputer shown in FIG. 1.

After that, the gentle increase-mode sub-routine illustrated in FIG. 10 is executed at every elapse of the predetermined time ΔTb, so that the target pressurizing force P* is gradually increased due to step 1005. As a result, the braking torque gradually increases (increases by a torque corresponding to the positive value d at every elapse of the predetermined time ΔTb). If in this case, the pedal depressing force F on the brake pedal 50 is reduced and therefore the provisional target pressurizing force P0* is reduced or the target pressurizing force P* increases with elapse of time, so that the target pressurizing force P* becomes greater than the provisional target pressurizing force P0*, the microcomputer 21 makes determination of "Yes" in step 1015, and proceeds to step 1020. In step 1020, the microcomputer 21 ends the ABS control. Subsequently in step 1095, the microcomputer 21 temporarily ends the routine.

As described above, if the difference e becomes less than the first reference difference −e1 (if the slip rate becomes greater than a first slip rate (=S*+e1)) in the ABS control in the first embodiment, the rapid reduction mode is started to rapidly reduce the target pressurizing force P*. Therefore, the actual pressurizing force P (braking torque) is rapidly reduced, so that excessively great slip is immediately suppressed.

Then, when the difference e becomes greater than the second reference difference −e2 (when the slip rate becomes less than a second slip rate (=S*+e2)), the gentle reduction mode is started to gently reduce the target pressurizing force P*. Therefore, the actual pressurizing force P (braking torque) is gently reduced.

In general, in the ABS control, if the slip rate becomes excessively great, the slip rate is reduced by rapidly reducing the braking torque. After that, the slip rate is increased to a certain level by rapidly increasing the braking torque. In order to carry out this control in an electric disc brake 10 equipped with an electric motor 11, it is necessary to forwardly operate the electric motor 11 at a great speed immediately after reversely operating the electric motor 11 at a great speed. However, when the supply current to the electric motor 11 is switched from the reverse current to the forward current in order to forwardly operate the electric motor 11 at a great speed after reversely operating the electric motor 11 at a great speed, the electric motor 11 continues operating in the reverse direction due to its inertia. Therefore, there is a possibility of undershoot of the actual pressurizing force P and of deterioration of in the next pressure rise response of the pressurizing force. Hence, if the rapid reduction mode is followed by the gentle reduction mode and then the rapid increase mode is started as in the embodiment, an advantage is achieved in that undershoot of the braking torque is not caused and excessive reduction in the slip rate is not caused.

Figure 12:
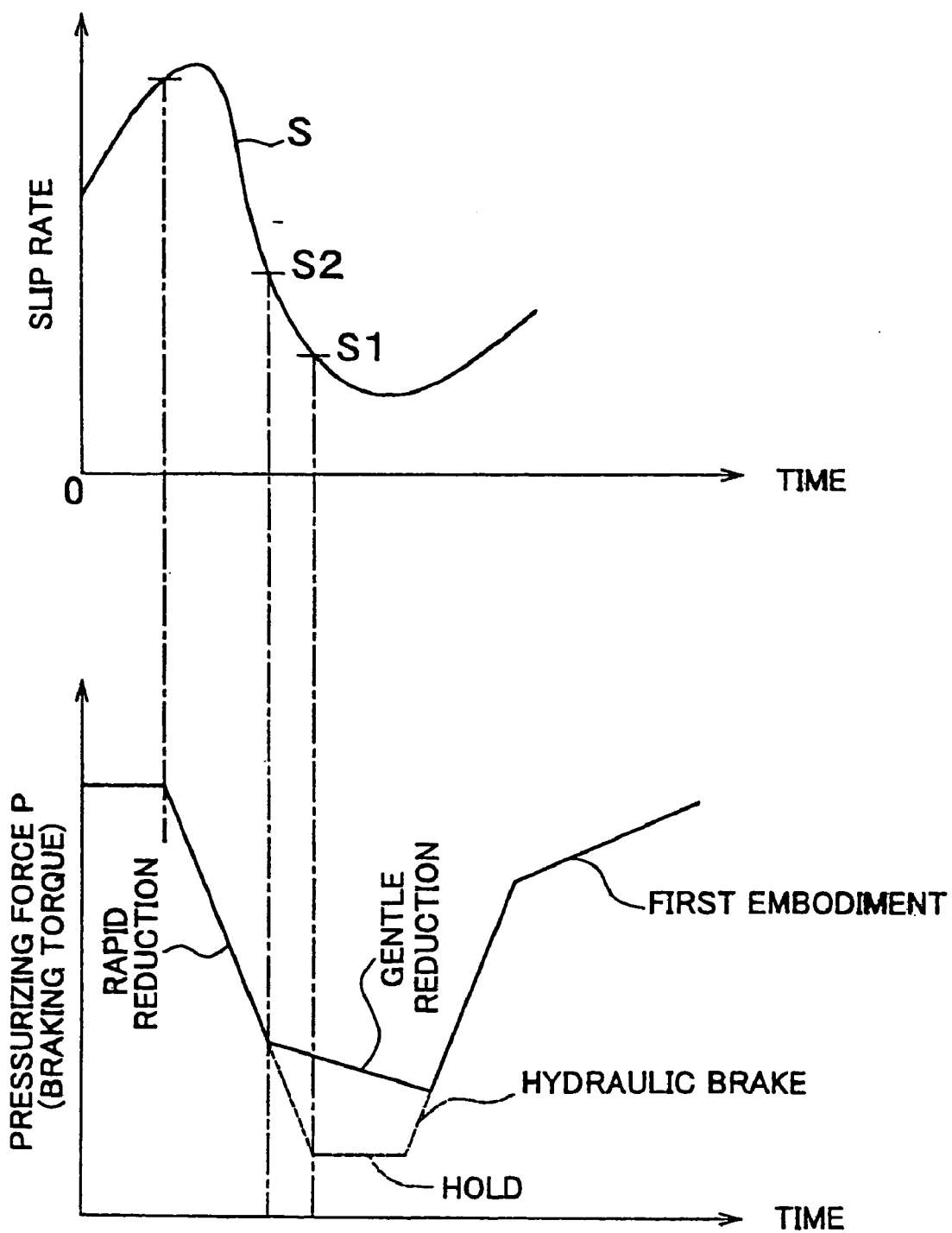
FIG. 12 is a time chart indicating changes in the slip rate and the pressurizing force during a pressure reduction in the first embodiment.

If the electric motors 11 are employed, the braking torque can be reduced by the gentle reduction mode. Therefore, the amount of reduction in the braking torque can be reduced, in comparison with a case where after the braking torque is rapidly reduced, the braking torque is held and is then rapidly increased. This will be described with reference to FIG. 12. Even if a hydraulic brake that utilizes a hydraulic linear valve is utilized as a hydraulic brake, it is difficult to control very small amounts of gentle increases and gentle decreases in the pressurizing force (braking torque) due to constraints related to the structure of the electromagnetic valve. Therefore, a rapid reduction in the braking torque is followed by the holding of the braking torque as indicated by a dotted line in FIG. 12. However, if the pressurizing force (braking torque) is held, reduction in the braking torque cannot be expected. Therefore, it is inevitable to rapidly reduce the pressurizing force (braking torque) until the slip rate decreases to or below a reference value S1. In contrast, in the embodiment in which the braking torque can be gently reduced, it is possible to wait for recovery of the slip rate by starting the gentle reduction mode at a time point at which the slip rate decreases to a reference value S2 that is greater than the reference value S1. Therefore, it becomes possible to avoid excessive reduction in the braking torque, and it becomes unnecessary to rotate the electric motor 11 more than necessary in the subsequent rapid increase mode. As a result, useless energy consumption can be avoided.

Next, a control based on the main routine during the ABS control will be described with reference to FIGS. 3 and 11.

Before the wheel becomes locked after the brake has been depressed, that is, before t11, the electric motor 11 is being operated forward so that the brake pad 110 is pressed against the disc rotor 102.

Then, at t11, when the ABS starts, determination of "Yes" is made in step 305, and the process proceeds to step 315, skipping the determination of a target pressurizing force P* in step 310. Since the ABS has just been started and the operation of the electric motor 11 has not been reversed at this moment, determination of "Yes" is made in step 315, and the process proceeds to step 320. In step 320, it is determined whether P–P* is greater than threshold A. Since the value P* is a value determined in step 705 of the rapid reduction-mode described in FIG. 7, that is, a value obtained by subtracting the predetermined value a, determination of "Yes" is made in step 320. Therefore, the predetermined value a is preferably a value that immediately achieves P–P*>A. This is because such a predetermined value a improves the ABS responsiveness. Subsequently in step 335, the operation of the electric motor 11 is reversed, so that the braking torque is reduced and the actual slip rate is correspondingly reduced. In the steps that follow, the electric motor 11 is operated reversely and the P* is less than P. Therefore, determination of "Yes" is made in step 325, and determination of "No" is made in step 330.

Figure 11:
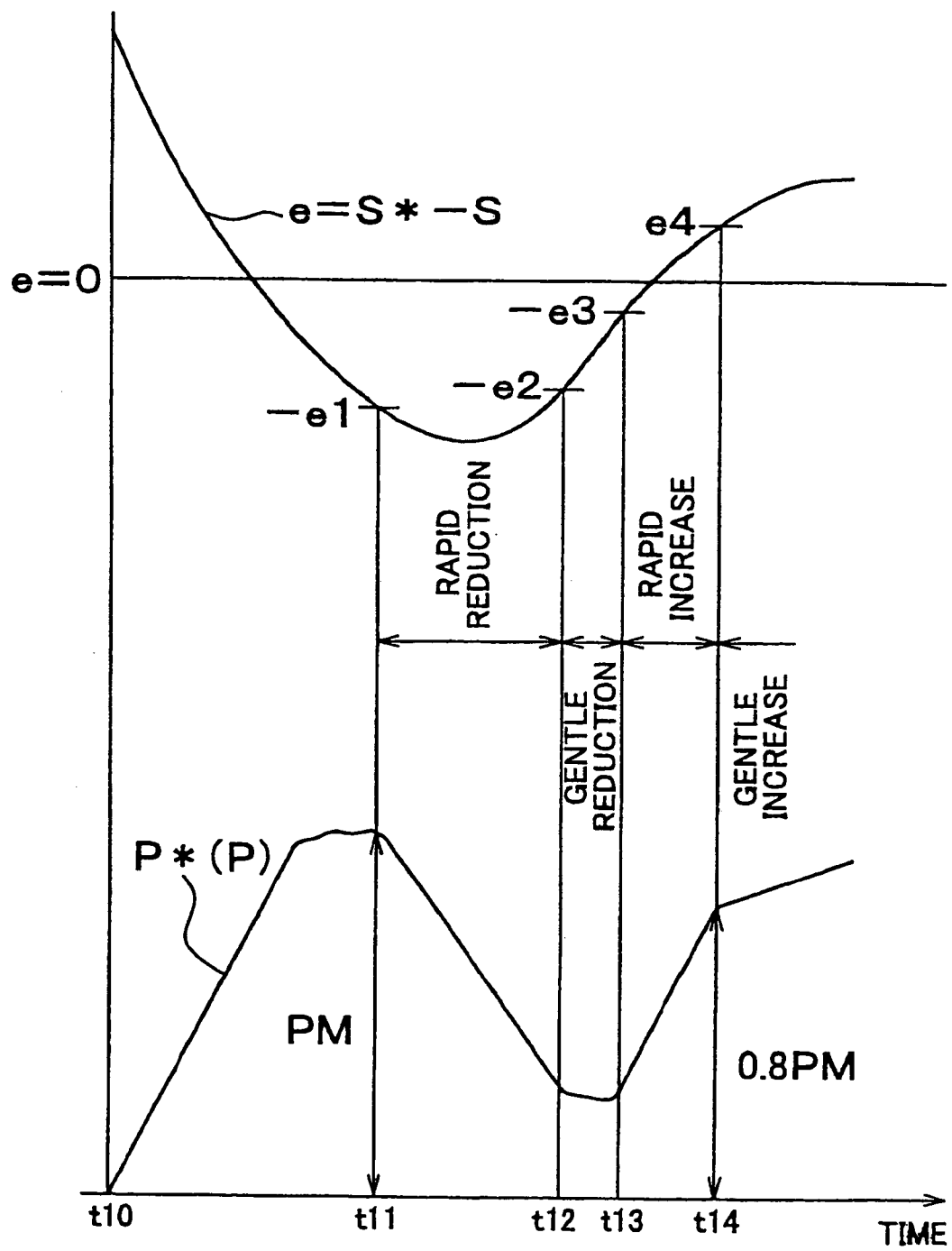
FIG. 11 is a time chart indicating changes in the difference between the target slip rate and the actual slip rate during the ABS control in the first embodiment.

Next described will be a control based on the main routine between t11 and t13 in FIG. 11. During this time period, the ABS control is being executed, and the electric motor 11 is being reversely operated, and P* is less than P. Therefore, determination of "Yes" is made in step 305, and determination of "No" is made in step 315, and determination of "No" is made in step 345, and determination of "Yes" is made in step 325, and determination of "No" is made in step 330. This control is repeatedly executed during the period of t11 to t13.

At t13, the mode of rapidly increasing the target pressurizing force P* starts. That is, in step 905 in FIG. 9, the predetermined value c is added to the target pressurizing force P*. Immediately after t13, the determinations in steps 305 to 315 remain the same as during the period of t11 to t13. In step 345, the target pressurizing force P* is higher than the actual pressurizing force P because the target pressurizing force P* is the value P* obtained by adding the predetermined value c in step 905. Therefore, the predetermined value c is preferably a value that immediately achieves P≦P*. Such a predetermined value c will improve the responsiveness to the rapid increase mode. Then in step 350, the turning of the electric motor 11 is stopped. In step 355, the flag F1 is updated to "1". Since the turning of the electric motor 11 is at a stop and the target pressurizing force P* is higher than the actual pressurizing force P at this moment, determination of "Yes" is made is step 325, and determination of "Yes" is made in step 330. Subsequently in step 360, the turning of the electric motor 11 is reversed. In step 365, the flag F2 is updated to "0".

Next described will be a control based on the main routine in which the ABS control is ended after t13. During this period, the ABS control is being executed, and the flag F1 is "1", and the target pressurizing force P* is higher than the actual pressurizing force P, and the flag F2 is "0". Therefore, determination of "Yes" is made in step 305, and determination of "Yes" is made in step 315, and determination of "No" is made in step 320, and determination of "No" is made in step 325, and determination of "No" is made in step 370. Then in step 375, the supply current I for forwardly turning the electric motor 11 is increased. Therefore, until the ABS control after t13 ends, the above-described routine is repeatedly executed, so that the supply current I is continually increased. Thus, the actual pressurizing force P is increased, and the braking torque is increased.

Then, when the ABS control is ended in step 1020, the process returns to the above-described control of normal operation of the main routine.

During this state, the electric motor 11 is being forwardly rotated, and the target pressurizing force P* is higher than the actual pressurizing force P. Therefore, determination of "Yes" is made in step 315, and determination of "No" is made in step 320, and determination of "No" is made in step 325.

In the foregoing embodiment, after the gentle reduction mode, the rapid increase mode is started. The mode is then changed to the gentle increase mode when the actual pressurizing force P or the target pressurizing force P* recovers to α times the actual pressurizing force P occurring at the start of the ABS control (start of the rapid reduction mode) or α times (α·PM) of the target pressurizing force P* (initial pressurizing force PM). Therefore, the possibility of the wheel becoming locked again is reduced in comparison with a case where the actual pressurizing force P is rapidly increased to the target pressurizing force P* or the actual pressurizing force P occurring at the start of the ABS control. Therefore, in the embodiment, rapid reduction in the pressurizing force and frequent repetitions of rapid increase are avoided, so that more stable ABS control can be accomplished.

Furthermore, due to the adoption of the gentle reduction mode and the gentle increase mode, the transition from reduction in the braking torque to increase in the braking torque is smoothly performed, so that vibrations caused in the vehicle can be reduced.

In the first embodiment, steps 320, 345, 330, 370 form braking torque change request determining means for determining whether to increase the braking torque or whether to reduce the braking torque based on the actual pressurizing force P and the pedal depressing force F (target pressurizing force P*), that is, detected quantities of state of the vehicle. Furthermore, steps 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction (forward) if it is determined that the braking torque is to be increased, and so that the electric driving device (the electric motor 11) does not drive (rotate) in a the predetermined direction (controlling the supply of electric current to the electric motor 11 so that the force pressing the braking member against the braked member is lower than a restoring force of the braking member to restore in its original state, discontinuing the current supplied to the electric motor, prohibiting the current from being supplied to the electric motor, preventing the current from being supplied to the electric motor, refraining from supplying supply current by cutting off the current, or supplying the electric motor 11 with such a current as to rotate the electric motor 11 in a direction opposite to the aforementioned predetermined direction (reversely rotate the motor))if it is determined that the braking torque is to be reduced. Furthermore, steps 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction (forward) if it is determined that the braking torque is to be increased, and so that the electrical current supplied to the electric motor 11 is lower than required to drive (rotate) the electric driving device (the electric motor 11)in a the predetermined direction(controlling the supply of electric current to the electric motor 11 so that the force pressing the braking member against the braked member is lower than a restoring force of the braking member to restore in its original state, discontinuing the current supplied to the electric motor, prohibiting the current from being supplied to the electric motor, preventing the current from being supplied to the electric motor, refraining from supplying supply current by cutting off the current, or supplying the electric motor 11 with such a current as to rotate the electric motor 11 in a direction opposite to the aforementioned predetermined direction (reversely rotate the motor)) if it is determined that the braking torque is to be reduced. Furthermore, steps 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction if it is determined that the braking torque is to be increased, and so that the electrical current supplied to the electric driving device (the electric motor 11) is lower than required to drive (rotate) the electric driving device (the electric motor 11) in a the predetermined direction if it is determined that the braking torque is to be reduced.

Furthermore, steps 320, 330 form determining means for determining whether a difference between the target pressurizing force P* and the actual pressurizing force P, that is, the amount of request for changing the braking torque based on a quantity of state of the vehicle, is greater than a predetermined amount. Steps 335, 360 form current supplying means for supplying a predetermined electric current (starting to supply current) to the electric driving device (the electric motor 11) in accordance with whether the amount of request for change is greater than a predetermined amount (threshold A, B) Still further, steps 310, 705, 805, 905, 1005 form target pressurizing force determining means for determining a target pressurizing force P* based on a quantity of state of the vehicle.

Furthermore, the routines illustrated in FIG. 3 and FIGS. 6 to 10 form current control means for changing the target pressurizing force P* so that the changing rate of the pressurizing force is changed in accordance with the detected slip rate S (the difference e in the foregoing embodiment) and for controlling electric current supplied to the electric driving device (the electric motor 11) so that the actual pressurizing force P becomes equal to the target pressurizing force P*, and also form current control means for controlling the electric current supplied to the electric driving device (the electric motor 11) so that when the detected slip rate becomes greater than a predetermined amount SL (when the difference e becomes less than the first reference difference −e1 in the foregoing embodiment), reduction of the pressurizing force is started by reducing the target pressurizing force P*, and then (see the time t13 in FIG. 11), the pressurizing force is increased by increasing the target pressurizing force P*, and the changing rate of the pressurizing force is gradually decreased by changing the changing rate of the target pressurizing force P* during the increase in the pressurizing force.

Still further, FIG. 3 and FIGS. 6 to 8 form current control means for controlling the electric current supplied to the electric motor 11 so that when the detected slip rate becomes equal to a predetermined amount (i.e., when the difference e becomes less than the first reference difference −e1 in the foregoing embodiment), the pressurizing force is rapidly reduced, and after that (i.e., when the difference e becomes greater than the second reference difference −e2 in the foregoing embodiment), the pressurizing force is gently reduced.

Further, the steps forming the braking torque change request means also serve as the braking torque change request determining means.

Figure 13:
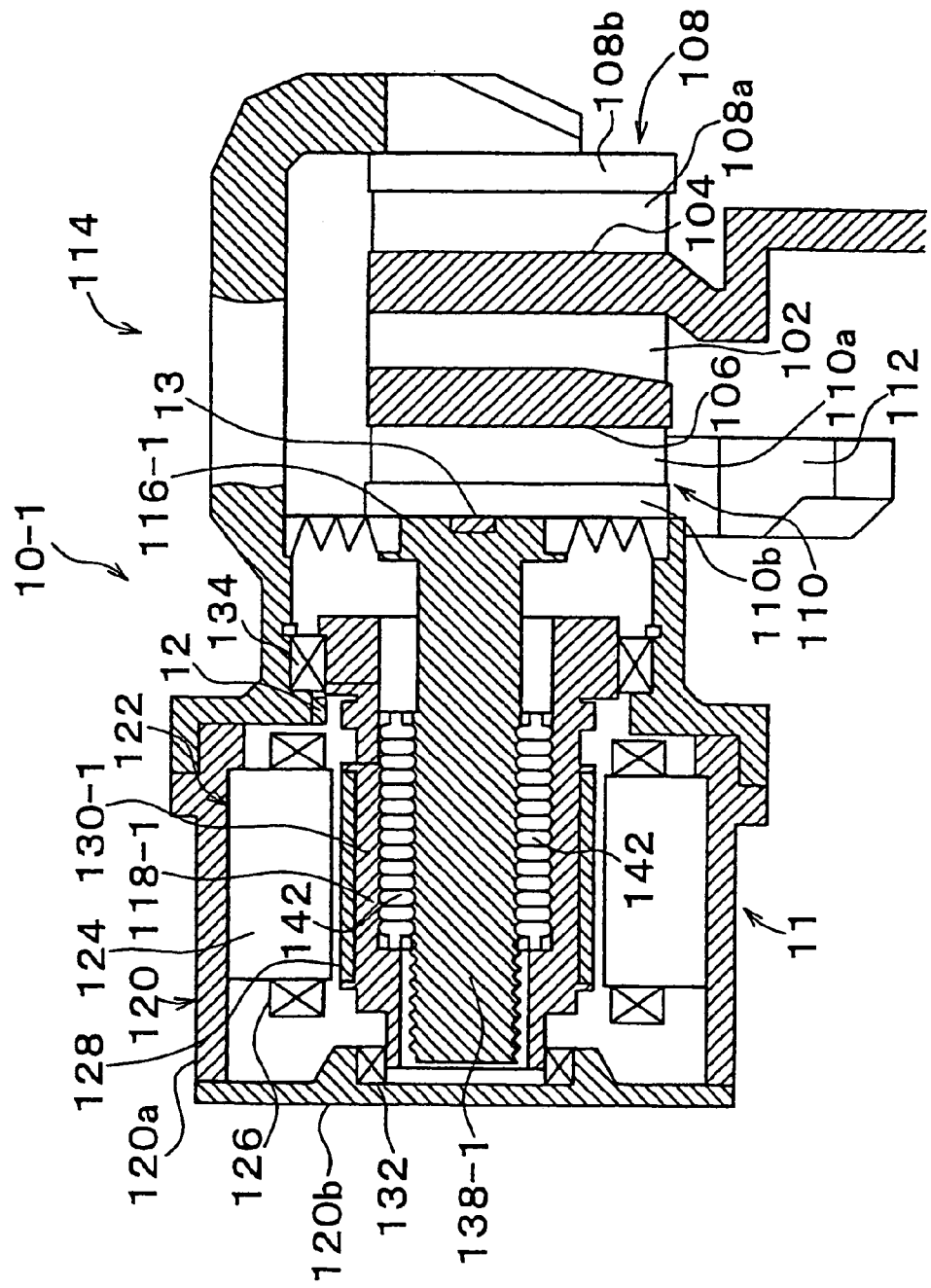
FIG. 13 is a sectional view of an electric disc brake in accordance with a modification of the first embodiment.

A modification of the first embodiment will be next be described. This modification differs from the foregoing embodiment only in that each electric disc brake 10-1 employs a roller screw as shown in FIG. 13. In the below description, component portions of the electric disc brake 10-1 which are corresponding to those of the electric disc brake 10 are represented by the same reference characters, and will not be described again. Only different features will be described.

In the electric disc brake 10-1 in accordance with this modification, a pressurizing member 116-1 and an electric motor 11 are interconnected by a roller screw 118-1 provided as a motion converting mechanism. More specifically, a thread having a predetermined lead angle is formed on an inner peripheral surface of a nut 130-1. A thread is also formed on an outer peripheral surface of a screw shaft 138-1 that is integrally formed in the pressurizing member 116-1 and that extends through the interior of the nut 130-1. A plurality of threaded rollers 142 engaged with the thread on the inner peripheral surface of the nut 130-1 and the thread on the outer peripheral surface of the screw shaft 138-1 extend in the directions of an axis. As the nut 130-1 is rotated, the threaded rollers 142 rotate like planetary gears without moving in the directions of the axis, thereby moving the pressurizing member 116-1 (the screw shaft 138-1) in the directions of the axis.

In the electric disc brake 10-1 employing the roller screw 118-1, the inverse efficiency of the roller screw 118-1 is low (the inverse efficiency is about half the inverse efficiency of the aforementioned ball screw). Therefore, even if the pressurizing member 116-1 receives force in such a direction as to weaken the braking torque (force in the leftward direction in FIG. 13), the pressurizing member 116-1 is prevented from moving. Therefore, in order to reduce the actual pressurizing force P in a case where the electric disc brake 10-1 is adopted, it is necessary to reverse the electric motor 11 as in the first embodiment.

Next described will be a second embodiment of the vehicular brake control apparatus of the invention. A brake control apparatus in accordance with the second embodiment has substantially the same overall construction as in the first embodiment.

Figure 14:
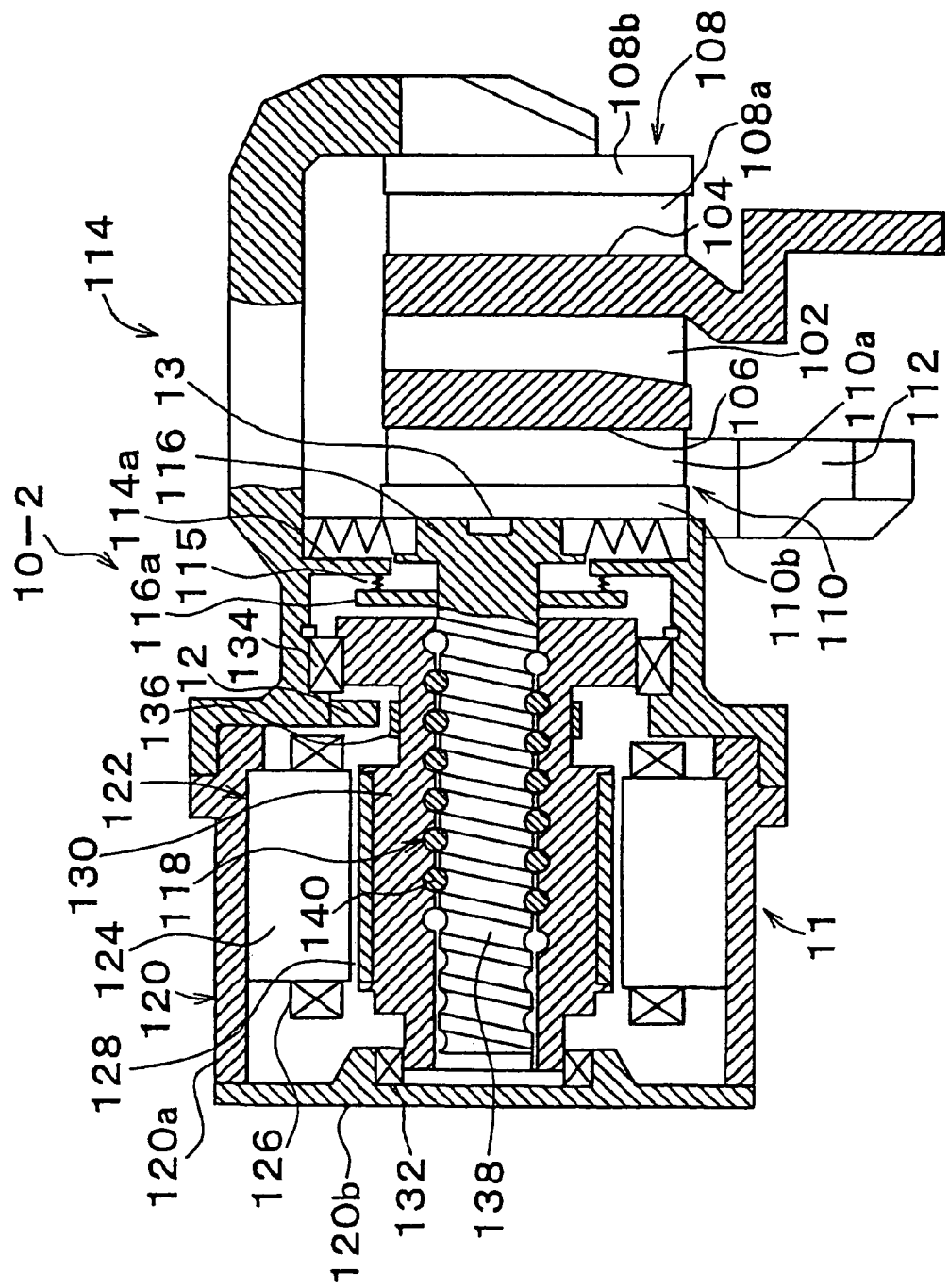
FIG. 14 is a sectional view of an electric disc brake in accordance with a second embodiment of the invention.

The second embodiment employs an electric disc brake 10-2 shown in FIG. 14, instead of the electric disc brake 10 shown in FIG. 2. The electric disc brake 10-2 differs from the electric disc brake 10 shown in FIG. 2 only in that the electric disc brake 10-2 has a return mechanism. Therefore, in the description below, portions of the electric disc brake 10-2 which are corresponding to those of the electric disc brake 10 are represented by the same reference characters, and will not be described. Only different features will be described.

That is, the electric disc brake 10-2 has a brim portion 116a that extends from an outer peripheral portion of an electric motor 11—side portion of a pressurizing member 116 in directions perpendicular to an axis of the pressurizing member 116. A caliper 114 has a protruded portion 114a that faces the brim portion 116a. A compressed spring 115 is disposed as a return spring between the brim portion 116a and the protruded portion 114a. The return spring 115 urges the pressurizing member 116 toward the electric motor 11 (leftward in FIG. 14). The return spring 115 has a function of separating brake pads 108, 110 from a disc rotor 102 (substantially the same as the function of a piston seal in a well-known hydraulic disc brake). Together with the brim portion 116a and the protruded portion 114a, the return spring 115 forms the aforementioned return mechanism (return force applying means for applying to the electric motor a force in a direction opposite to the direction of the force by which the electric motor presses the braking member against the brake member). Therefore, when the electric motor 11 does not produce force that presses the pressurizing member 116 toward the disc rotor 102 (rightward in FIG. 14), the pressurizing member 116 is moved by elastic force of the return spring 115 in such a direction as to move apart from the disc rotor 102 (leftward in FIG. 14), so that braking torque is not produced.

Operation of the brake control apparatus of the second embodiment will next be described. In the second embodiment, the microcomputer 21 executes a main routine illustrated in FIG. 15 at every elapse of a predetermined time, instead of the main routine illustrated in FIG. 3. The main routine illustrated in FIG. 15 and the main routine illustrated in FIG. 3 have steps in common. Like steps are represented by like reference characters.

Firstly, a case where the ABS control is not being executed will be described. At a predetermined timing, the microcomputer 21 starts the process at step 1500. In step 1505 in which it is determined whether the ABS control is presently being executed, the microcomputer 21 makes determination of "NO". The microcomputer 21 then proceeds to step 1510, in which the microcomputer 21 determines a present target pressurizing force P* from the map of the target pressurizing force P* with respect to the pedal depressing force F indicated in FIG. 5A and the actual pedal depressing force F detected by the depressing force sensor 43. Subsequently, the microcomputer 21 proceeds to step 1515, in which the microcomputer 21 determines whether the actual pressurizing force P is less than the determined target pressurizing force P*. If the actual pressurizing force P is less than the target pressurizing force P*, the microcomputer 21 makes determination of "Yes" in step 1515, then proceeds to step 1520. In step 1520, the microcomputer 21 determines a supply current I from a map that indicates a relationship between the target pressurizing force P* and the supply current I as indicated in FIG. 5B and the target pressurizing force P* determined in step 1510. As a result, a current I=g(P*) is supplied to the electric motor 11 by an electric motor driving routine (not shown), so that the electric motor 11 operates forward. Therefore, the actual pressurizing force P increases, and the braking torque increases. Then, the microcomputer 21 proceeds to step 1595, in which the microcomputer 21 temporarily ends the routine.

Conversely, if the actual pressurizing force P is greater than the target pressurizing force P*, the microcomputer 21 makes determination of "No" in step 1515, and proceeds to step 1525. In step 1525, the microcomputer 21 sets the value of supply current I to the electric motor 11 to "0". Therefore, no current flows through the electric motor 11, and the electric motor 11 does not produce any rotating torque. As a result, the pressurizing member 116 is pushed by the aforementioned return mechanism in such a direction as to move apart from the disc rotor 102. Hence, the actual pressurizing force P decreases, and the brake pad 110 moves away from the disc rotor 102. Therefore, the braking torque also decreases. Then, the microcomputer 21 proceeds to step 1595, in which the microcomputer 21 temporarily ends the routine. Operation is performed as described above in the case where the ABS control is not being executed.

Figure 16:
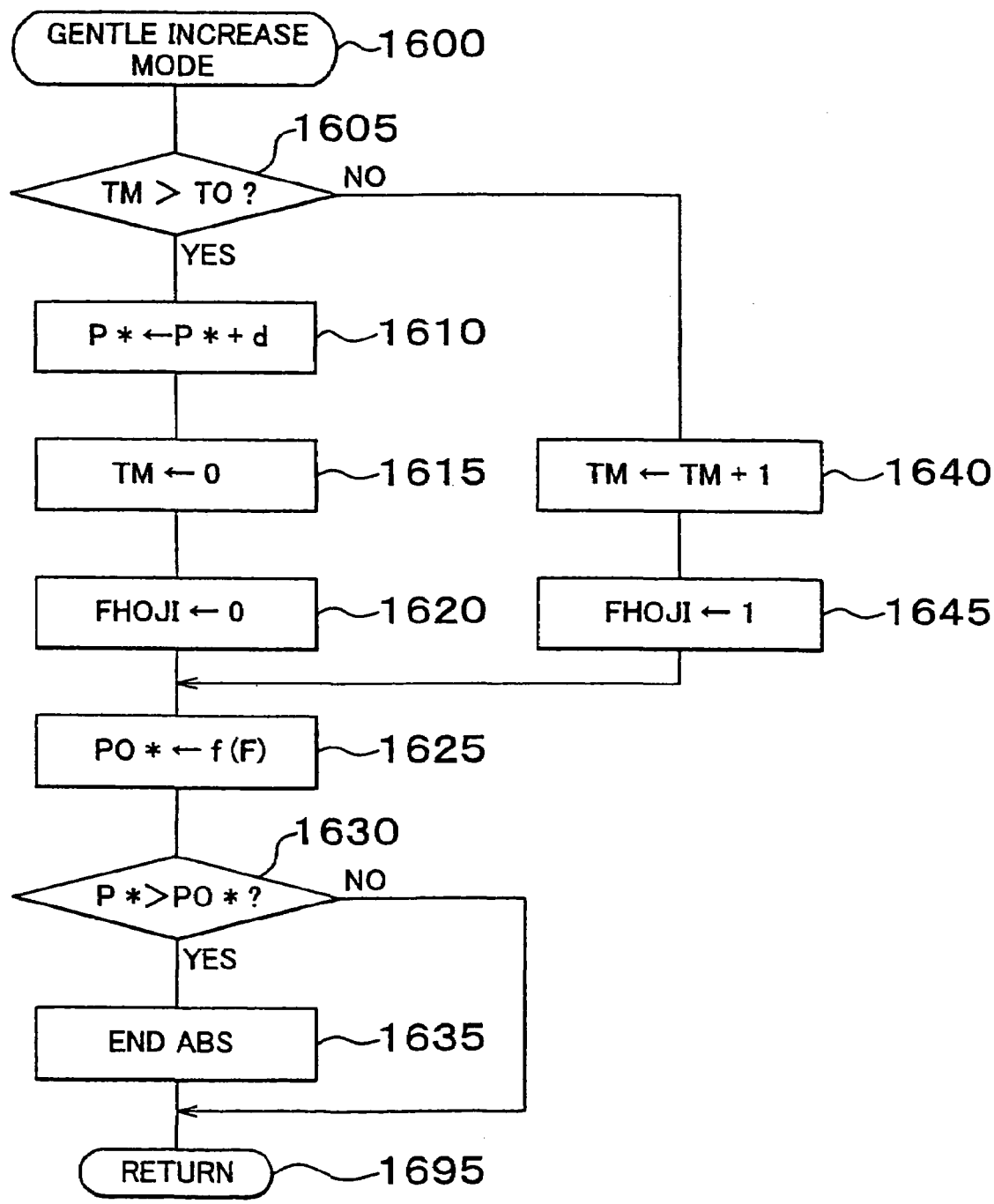
FIG. 16 is a flowchart illustrating a gentle increase-mode sub-routine (program) executed by the microcomputer in the second embodiment.

Operation of the ABS control in accordance with the second embodiment will next be described. The microcomputer 21 executes the routines illustrated in FIGS. 6 to 9 described above in conjunction with the first embodiment at every elapse of a predetermined time and, furthermore, executes a routine illustrated in FIG. 16 at every elapse of a predetermined time instead of the routine illustrated in FIG. 10. Therefore, the second embodiment operates substantially in the same manner as the first embodiment until a gentle reduction-mode routine illustrated in FIG. 16 (a routine corresponding to the gentle increase-mode control routine indicated in step 675 in FIG. 6 in the first embodiment) is executed.

More specifically, if the slip rate difference e (=target slip rate S*−actual slip rate S) becomes equal to or less than the first reference difference −e1 while the ABS control is not executed, the microcomputer 21 starts the ABS control in the rapid reduction mode. Thus, the microcomputer 21 comes to execute the rapid reduction-mode sub-routine illustrated in FIG. 7 at every elapse of the predetermined ΔTb. In this case, after starting the main routine illustrated in FIG. 15 at step 1500, the microcomputer 21 makes determination of "Yes" in step 1505 since the ABS control has been started. The microcomputer 21 then proceeds to step 1530. In step 1530, the microcomputer 21 determines whether the value of a flag FHOJI is "1". The value of the flag FHOJI is set to "1" at the time of a request for holding the pressurizing force in a gentle increase-mode sub-routine described below. In the other cases, the value of the flag FHOJI is set to "0". Therefore, since at this moment, the value of the flag FHOJI is "0", the microcomputer 21 makes determination of "No" in step 1530, and then proceeds to step 315 and steps that follow.

In this case, the target pressurizing force P* has been reduced by a positive value a in the rapid reduction-mode sub-routine. Therefore, the microcomputer 21 makes determination of "Yes" in step 320, and proceeds to step 335. In step 335, the microcomputer 21 sets the electric current I to be supplied to the electric motor 11 to a predetermined negative current (−I0). Thus, the current −I0 is supplied to the electric motor 11 by the electric motor driving routine (not shown), so that the electric motor 11 is reversely operated and the actual pressurizing force P is reduced without a delay.

That is, since in the second embodiment, the pressurizing member 116 is provided with the return mechanism, the actual pressurizing force P naturally decreases if no current is supplied to the electric motor 11 (see step 1525 when the ABS control is not executed). However, during the ABS control and, in particular, an early period of the rapid reduction mode, there is a need to immediately reduce an excessively great slip rate, and therefore mere discontinuation of electrification of the electric motor 11 results in a delayed reduction in the actual pressurizing force P. In the second embodiment, therefore, upon a pressure reduction request during the ABS control (when P−P*>A), a current I is supplied to the electric motor 11 so as to reversely operate the electric motor 11. After that, the microcomputer 21 executes steps 340, 325, 330, and then proceeds to step 1595, in which the microcomputer 21 temporarily ends the routine.

After that, the rapid reduction mode is continued, so that the actual pressurizing force P decreases and the braking torque decreases. Therefore, the slip rate difference e becomes greater than the second reference difference −e2 (see FIG. 11 used in the description of the first embodiment). Therefore, the microcomputer 21 makes determination of "Yes" in step 640 in FIG. 6, and proceeds to step 645, in which the microcomputer 21 starts the gentle reduction mode. From then on, the microcomputer 21 executes the gentle reduction-mode sub-routine illustrated in FIG. 8 at every elapse of the predetermined time ΔTb. In this case, too, the value of the flag FHOJI is held at "0", so that the microcomputer 21 executes the predetermined steps of steps 315 to 385 in FIG. 15. As a result, step 335 is executed, so that the actual pressurizing force P is gently reduced and the braking torque is also gently reduced.

When the slip rate difference e becomes greater than the third reference difference −e3 as the aforementioned state continues, the microcomputer 21 makes determination of "Yes" in step 655 in FIG. 6, and proceeds to step 660, in which the microcomputer 21 starts the rapid increase mode. From that time on, the microcomputer 21 executes the rapid increase-mode sub-routine at every elapse of the predetermined time ΔTb illustrated in FIG. 9. In this case, too, the value of the flag FHOJI is held at "0", so that the microcomputer 21 executes the corresponding steps of steps 315 to 385 in FIG. 15. As a result, steps 360, 375 are executed, so that the actual pressurizing force P is rapidly increased and the braking torque is also rapidly increased.

After that, when the actual pressurizing force P recovers to the actual pressurizing force P occurring at the time of start of the rapid reduction mode or α times the target pressurizing force P* (i.e., initial pressurizing force PM) (α·PM), or when the slip rate difference e becomes greater than the fourth reference difference e4, the microcomputer 21 starts the gentle increase mode. From then on, the microcomputer 21 executes the gentle increase-mode sub-routine at every elapse of the predetermined time ΔTb.

The process of the gentle increase mode sub-routine will be described. In step 1605 subsequent to step 1600, the microcomputer 21 determines whether the value of a timer TM is greater than a predetermined value T0. The initial value of the timer TM has been set to a maximum value by an initial routine (not shown). Therefore, the microcomputer 21 makes determination of "Yes" in step 1605, and increases the target pressurizing force P* by a positive value d in step 1610. Subsequently in step 1615, the microcomputer 21 clears the value of the timer TM to "0", and sets the value of the flag FHOJI to "0" in step 1620. As the value of the flag FHOJI has been "0" at this moment, step 1620 is a mere confirming operation.

Subsequently, the microcomputer 21 proceeds to step 1625, in which the microcomputer 21 determines a provisional target pressurizing force P0* from the present pedal depressing force F and the map indicated in FIG. 5A. In step 1630, the microcomputer 21 determines whether the target pressurizing force P* is greater than the provisional target pressurizing force P0*. If the target pressurizing force P* is greater than the provisional target pressurizing force P0*, the microcomputer 21 proceeds to step 1635, in which the microcomputer 21 ends the ABS control. Subsequently instep 1695, the microcomputer 21 ends the routine. Conversely, if the target pressurizing force P* is less than the provisional target pressurizing force P0*, the microcomputer 21 proceeds immediately to step 1695, in which the microcomputer 21 temporarily ends the routine.

Description will be continued below on an assumption that a state in which the target pressurizing force P* does not exceed the provisional target pressurizing force P0* continues. Then, the microcomputer 21 does not proceed to step 1635, so that the ABS control is not ended. Therefore, when the microcomputer 21 executes the main routine in FIG. 15 at a predetermined timing, the microcomputer 21 makes determination of "Yes" in step 1505. In step 1530, the microcomputer 21 makes determination of "No" since the value of the flag FHOJI has been held at "0". Then, the microcomputer 21 executes the corresponding steps (steps 360, 375) of steps 315 to 385. As a result, the actual pressurizing force P approaches the target pressurizing force P* increased by the positive value d.

After the predetermined time ΔTb elapses, the microcomputer 21 starts the process of the gentle increase-mode sub-routine at step 1600 again. In this case, the value of the timer TM is less than the predetermined T0 since the value of the timer TM were cleared to "0" in step 1615 in the previous cycle. Therefore, the microcomputer 21 makes determination of "No" in step 1605, and proceeds to step 1640, in which the microcomputer 21 increases the value of the timer TM by "1". Subsequently in step 1645, the microcomputer 21 sets the value of the flag FHOJI to "1". The microcomputer 21 then proceeds to steps 1625, 1630, and to step 1695, in which the microcomputer 21 temporarily ends the routine.

Figure 15:
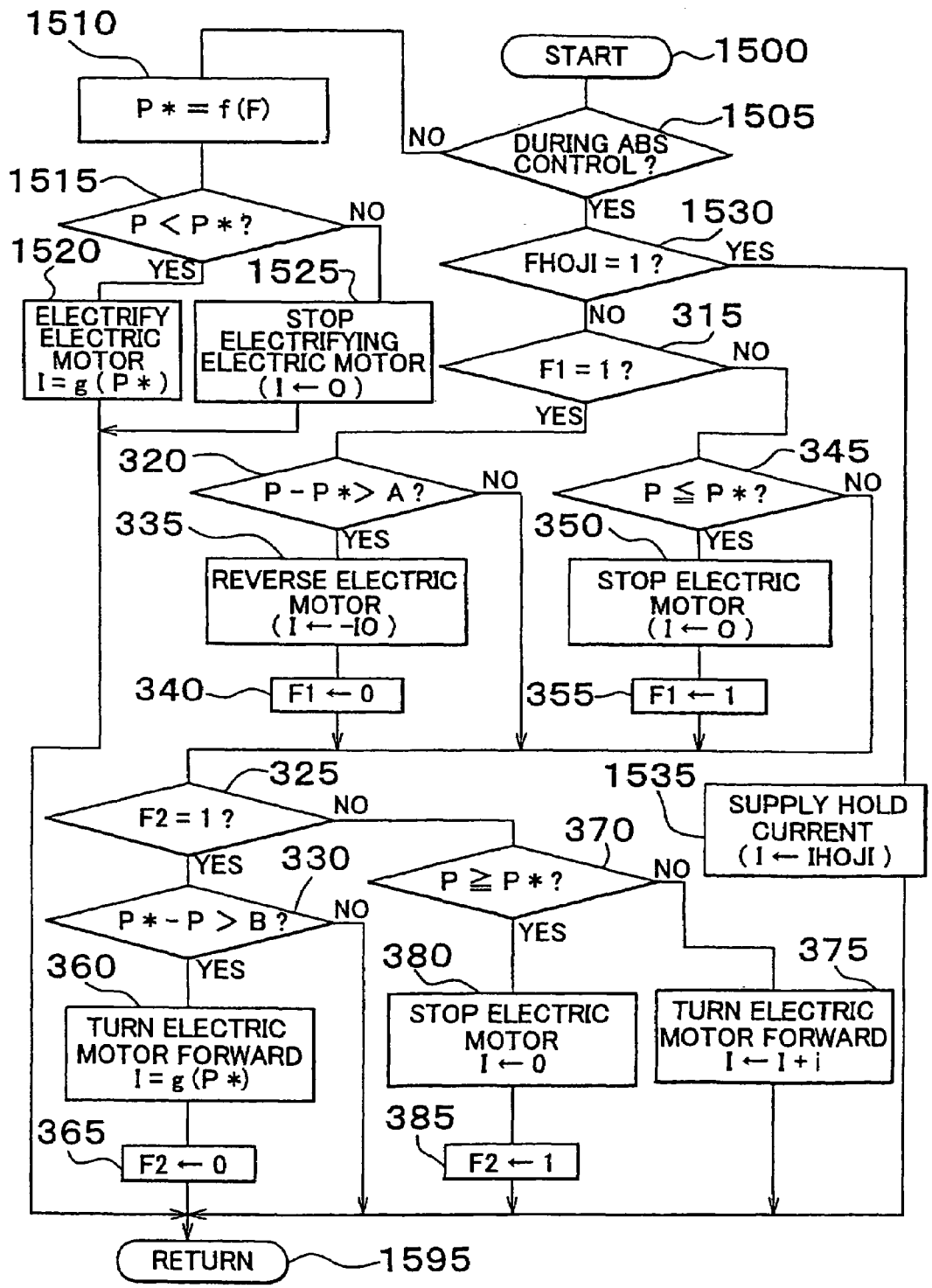
FIG. 15 is a flowchart illustrating a main routine (program) executed by a microcomputer in the second embodiment.

If during this state, the microcomputer 21 executes the main routine of FIG. 15, the microcomputer 21 makes determination of "Yes" in step 1530 after the microcomputer 21 makes determination of "Yes" in step 1505 and proceeds to step 1530. Subsequently, the microcomputer 21 proceeds to step 1535, in which the microcomputer 21 sets the supply current I to the electric motor 11 to a hold current IHOJI (current of a predetermined positive value) for holding the pressurizing member at a present position. Therefore, the current IHOJI is supplied to the electric motor 11 by the electric motor driving routine (not shown), so that the electric motor 11 produces a force in such a direction as to press the pressurizing member 116 (inner pad 110) toward the disc rotor 102. This force is set so as to balance the force by which the return mechanism moves the pressurizing member 116 away from the disc rotor 102. Therefore, the pressurizing member 116 does not shift in position. As a result, the actual pressurizing force P (braking torque) is held at a constant value.

If the state as described above continues, step 1640 in FIG. 16 is repeatedly executed. Therefore, the value of the timer TM gradually increases, and exceeds the predetermined value T0 when a predetermined time elapses. If in this case, the microcomputer 21 starts the process of the gentle increase-mode sub-routine at step 1600, the microcomputer 21 makes determination of "Yes" in step 1605, and executes the aforementioned steps 1610 to 1620. Therefore, the target pressurizing force P* is again increased by the positive value d, and the value of the flag FHOJI is set to "0". Therefore, step 360 or step 375 in FIG. 15 is executed, so that the actual pressurizing force P is increased by an amount corresponding to the positive value d.

From then on, the target pressurizing force P* is increased by the positive value d every time the value of the timer TM reaches the predetermined value T0. After that, the target pressurizing force PF* is held at a constant value until the value of the timer TM, after being cleared to "0", exceeds the predetermined value T0. Then, when the target pressurizing force P* becomes greater than the provisional target pressurizing force P0* during the above-described state, steps 1630, 1635 are executed, so that the ABS control is ended.

As described above, in a case where an ordinary service brake is applied while the ABS control is not executed, the brake control apparatus in accordance with the second embodiment supplies the electric motor 11 with a positive current I (=g(P*)) that is needed to achieve the target pressurizing force P* when the actual pressurizing force P is less than the target pressurizing force P*. When the actual pressurizing force P is greater than the target pressurizing force P*, the brake control apparatus sets the current I to be supplied to the electric motor 11 to "0", so that the electric motor 11 does not produce torque and the actual pressurizing force P is reduced by the return mechanism. Therefore, the brake control apparatus does not require repetition of forward and reverse operations of the electric motor, so that the service life of the electric motor 11 is increased.

In the second embodiment, steps 1515, 320, 345, 330, 370 form braking torque changing request determining means for determining whether to increase the braking torque or whether to reduce the braking torque based on the pedal depressing force F (target pressurizing force P*), that is, a detected quantity of state of the vehicle, and the actual pressurizing force P, that is, a quantity of state of the vehicle. Steps 1520, 1525, 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction (forward) if it is determined that the braking torque is to be increased, and so that the electric driving device (the electric motor 11) does not drive (rotate) in a the predetermined direction (controlling the supply of electric current to the electric motor 11 so that the force pressing the braking member against the braked member is lower than a restoring force of the braking member to restore in its original state, discontinuing the current supplied to the electric motor, prohibiting the current from being supplied to the electric motor, preventing the current from being supplied to the electric motor, refraining from supplying supply current by cutting off the current, or supplying the electric motor 11 with such a current as to rotate the electric motor 11 in a direction opposite to the aforementioned predetermined direction (reversely rotate the motor)) if it is determined that the braking torque is to be reduced. Steps 1520, 1525, 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction (forward) if it is determined that the braking torque is to be increased, and so that the electrical current supplied to the electric driving device (the electric motor 11) is lower than required to drive (rotate) the electric driving device (the electric motor 11) in a the predetermined direction (controlling the supply of electric current to the electric motor 11 so that the force pressing the braking member against the braked member is lower than a restoring force of the braking member to restore in its original state, discontinuing the current supplied to the electric motor, prohibiting the current from being supplied to the electric motor, preventing the current from being supplied to the electric motor, refraining from supplying supply current by cutting off the current, or supplying the electric motor 11 with such a current as to rotate the electric motor 11 in a direction opposite to the aforementioned predetermined direction (reversely rotate the motor)) if it is determined that the braking torque is to be reduced. Furthermore, Steps 1520, 1525, 335, 350, 360, 375, 380 achieve a function of current controlling means for controlling the supply of electrical current to an electric driving device (the electric motor 11) so that the electric driving device (the electric motor 11) is caused to drive (rotate) in a predetermined direction if it is determined that the braking torque is to be increased, and so that the electrical current supplied to the electric driving device (the electric motor 11) is lower than required to drive (rotate) the electric driving device (the electric motor 11)in a the predetermined direction if it is determined that the braking torque is to be reduced. Furthermore, step 1535 forms current supplying means for supplying a predetermined current (IHOJI) to the electric driving device (the electric motor 11) when it is determined that the braking torque should be held at a constant value based on a detected quantity of state of the vehicle.

Figure 17:
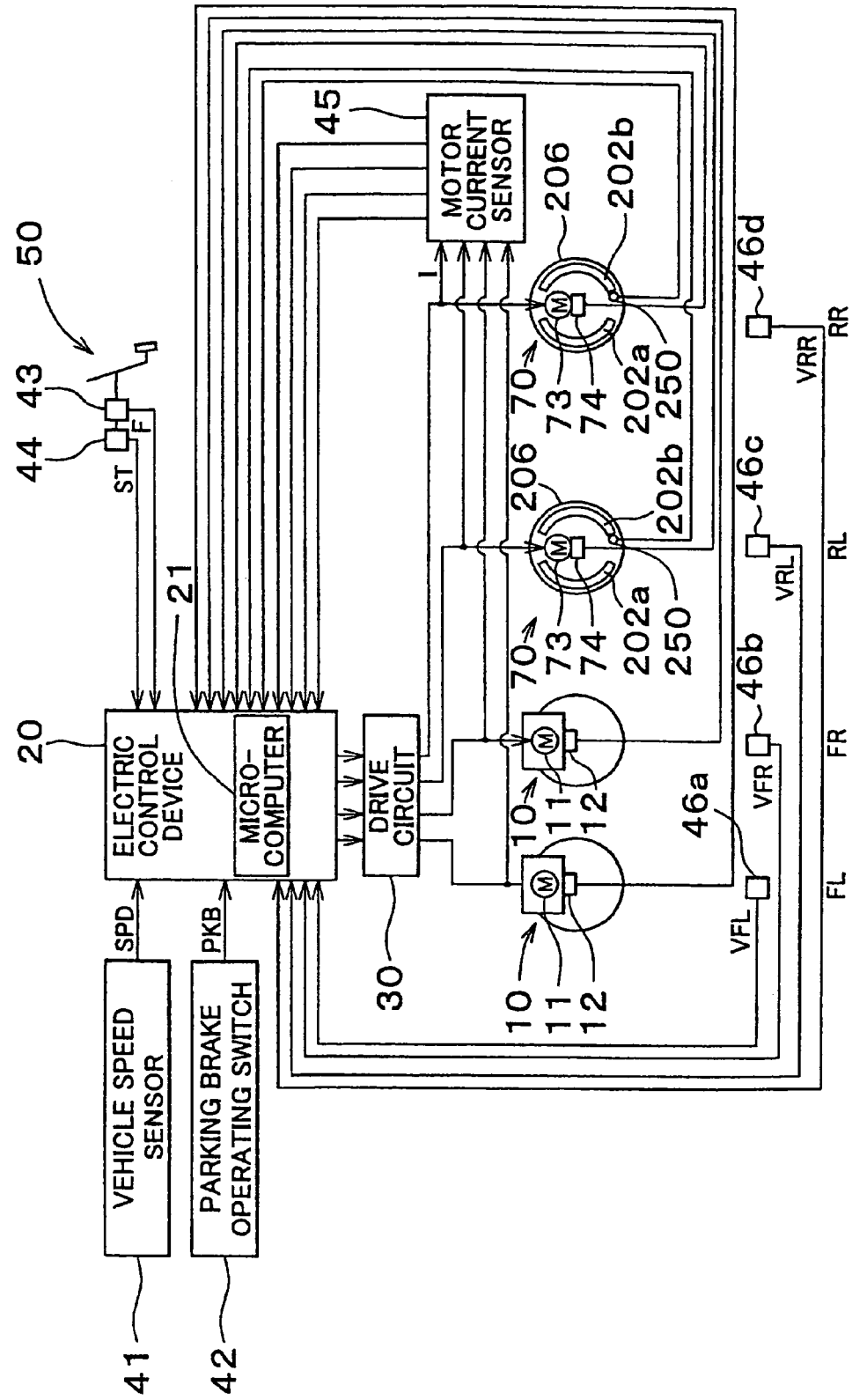
FIG. 17 is a diagram of an overall construction of an electric brake apparatus including a vehicular brake control apparatus in accordance with a third embodiment of the invention.

Next, a third embodiment of the vehicular brake control apparatus of the invention will be described. The third embodiment differs from the second embodiment only in that the brakes provided for the rear right and left wheels RR, RL are electric drum brakes 70 as shown in FIG. 17. Therefore, below description will be made mainly with respect to the different feature. Portions of the brake control apparatus which are the corresponding to those of the brake control apparatus shown in FIG. 1 are represented by the same characters in FIG. 17, and will not be described again.

Each electric drum brake 70 includes a drum 206, that is, a braked member rotatable together with the wheel, brake shoes 202a, 202b that is, a braking member that is unrotatably retained to a backing plate which is a vehicle body-side member and that is disposed so as to leave a predetermined clearance from the drum 206, a direct-current electric motor 73 that produces force in accordance with the current supplied, a position sensor 74 that detects the position X of the brake shoes 202a, 202b and a pressurizing force sensor 250. Using the force produced by the electric motor 73, the electric drum brake 70 moves (pushes) the brake shoes 202a, 202b into contact with an inner peripheral surface of the drum 206. By further pressing the brakes shoe 202a, 202b against the inner peripheral surface of the drum 206, the electric drum brake 70 produces braking torque that retards rotation of the wheel.

Figure 18:
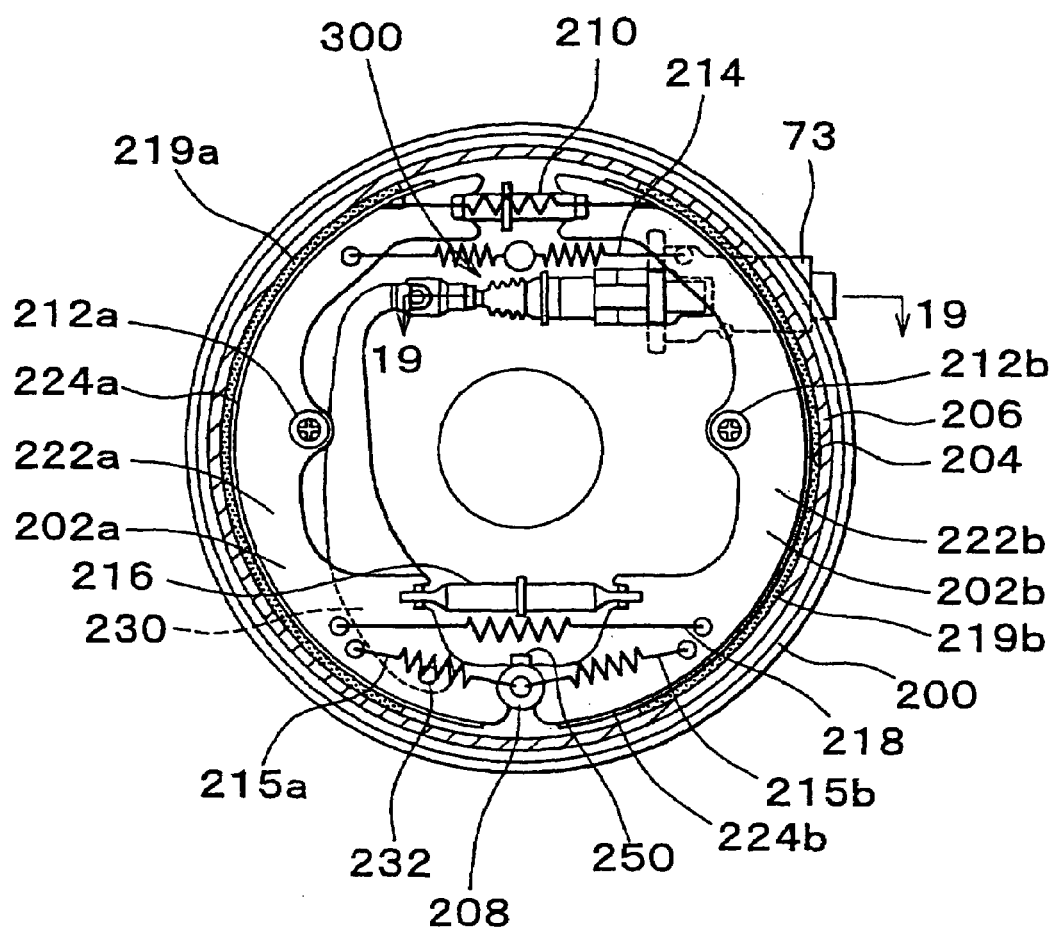
FIG. 18 is a sectional view of an electric drum brake shown in FIG. 17.

The electric drum brakes 70 are of a duo-servo type as illustrated in detail in FIG. 18. Each electric drum brake 70 includes a disc-shaped baking plate 200 that is unrotatably attached to a vehicle body-side member (not shown), a pair of generally arc-shaped brake shoes 202a, 202b provided on the backing plate 200, a drum 206 that has a friction surface on its inner peripheral surface 204 and that rotates together with the wheel, and an electric actuator 300 that expands end portions of the shoes 202*a*, 202*b* away from each other.

The two brake shoes 202*a*, 202*b* are retained by engaging first end portions thereof that face each other with an anchor pin 208 fixed to the backing plate 200 so that the brake shoes 202*a*, 202*b* are pivotable but are prevented from turning together with the drum 206.

The two brake shoes 202*a*, 202*b* are interconnected at second end portions by a strut 210. Due to the strut 210, force acting on one of the shoes transfers to the other shoe. Furthermore, the two brake shoes 202*a*, 202*b* can be moved along the backing plate 200 by shoe hold-down devices 212*a*, 212*b*, respectively.

The second end portions of the two brake shoes 202*a*, 202*b* are urged by springs 214 in such directions as to move closer to each other. The first end portions of the brake shoes 202*a*, 202*b* are urged by shoe return springs 215*a*, 215*b*, respectively, toward the anchor pin 208. A strut 216 and a return spring 218 are also provided at the first end portions of the brake shoes 202*a*, 202*b*.

Braking linings 219*a*, 219*b*, that is, friction engagement members, are retained on outer peripheral surfaces of the brake shoes 202*a*, 202*b*. The two brake linings 219*a*, 219*b* are brought into friction engagement with an inner peripheral surface 204 of the drum 206 so that friction force is produced between the brake linings 219*a*, 219*b* and the drum 206. In this embodiment, the strut 210 has an adjust mechanism that adjusts the clearance between the drum inner peripheral surface 204 and the brake linings 219*a*, 219*b* in accordance with the abrasion of the brake linings 219*a*, 219*b*.

The brake shoes 202*a*, 202*b* include rims 224*a*, 224*b* and webs 222*a*, 222*b*, respectively. A lever 230 is pivotably connected at first end portion thereof to the web 222*a* via a pin 232. Portions of the lever 230 and the web 222*a*, and the web 222*b* that face one other have cutouts. The strut 216 is engaged with these cutouts.

The electric actuator 300, including the electric motor 73, is connected to a second end portion of the lever 230. When the brake pedal 50 for the service brake purpose is operated, the lever 230 is pivoted due to the driving of the electric motor 73 (electric actuator 300). As a result, the brake shoe 202*a* is pushed toward the drum inner peripheral surface 204, with the points of engagement between the brake shoe 202*a* and the strut 216 and between the brake shoe 202*a* and the lever 230 serving as fulcrums. As the strut 216 receives reaction force from the drum inner peripheral surface 204, the brake shoe 202*b* is pushed toward the drum inner peripheral surface 204. That is, due to operation of the electric motor 73, the brake shoes 202*a*, 202*b* are expanded so that the friction engagement members (braking linings 219*a*, 219*b*) are pressed against the inner peripheral surface 204 of the drum 206, that is, the friction engagement members are brought into friction engagement with the drum inner peripheral surface 204. Thus, braking torque T is applied to the wheel.

In the above-described structure, the drag force based on the friction produced on shoe 202*b*, for example, the shoe 202*b*, and the brake actuating force caused by the electric actuator 300 (which can be considered an expansion force for expanding the two shoes 202*a*, 202*b*) are transferred from the second end portion of the shoe 202*b* to the second end portion of the other shoe 202*a* via the strut 210. As a result, the other shoe 202*a* is pressed against the drum inner peripheral surface 204 by the sum of the drag force and the expansion force, so that the shoe 202*a* produces a friction that is greater than the friction produced by the shoe 202*b*.

Thus, the output from one shoe 202*b* becomes the input to the other shoe 202*a*, and furthermore, a double servo effect is achieved. In this manner, the duo-servo type drum brake is able to produce great braking torque.

The anchor pin 208 is provided with a pressurizing force sensor 250 for detecting the load applied to the anchor pin 208. The pressurizing force sensor 250 is a strain sensor. As mentioned above, in the duo-serve type drum brake 70, the expansion force produced by the electric actuator 300 and the drag force based on friction occurring on one of the shoes are transferred to the second end portion of the other shoe via the strut 210, so that the other shoe is pressed against the drum 206 by the sum of the drag force and the expansion force. Due to the servo effect of the other shoe, the force transferred to that shoe via the strut 210 is further amplified, and then acts on the anchor pin 208. Therefore, by determining a braking torque based on the load applied to the anchor pin 208, the braking torque (actual braking torque) produced by the duo-serve type electric drum brake 70 can be detected. If the wheel is rotating or if the vehicle is on a slope or the like and the wheel receives a torque that tends to rotate the wheel, the actual braking torque represents the force (actual pressurizing force P) whereby the brake shoes 202*a*, 202*b* (brake linings 219*a*, 219*b*), that is, braking members, are pressed against the drum 206, that is, a braked member.

As shown in FIG. 19, the electric actuator 300 includes the electric motor 73, and a drive portion 304 that converts rotating motion of the electric motor 73 into reciprocating linear movements of an operating shaft 302. The electric motor 73 has therein the position sensor 74 for detecting the position Y of the shoe 202*a* (202*b*) by detecting the rotational position of the electric motor 73. The position Y of the brake shoe 202*a* (202*b*) may also be directly detected by a gap sensor or the like that is fixed to the backing plate 200 or the like.

The electric motor 73 is mounted in a housing 306 of the drive portion 304. The housing 306 and the electric motor 73 are fixed to the backing plate 200. A pinion 308 is fixed to a rotating shaft 23*a* of the electric motor 73. The pinion 308 is meshed with a first speed reducing gear 310, which is meshed with a second speed reducing gear 312.

The second speed reducing gear 312 is designed to rotate integrally with a nut 312*a*. The nut 312*a* is supported to the housing 306 so that the nut 312*a* is allowed to rotate relatively to the housing 306 and is prevented from moving in the directions of an axis of the operating shaft 302. The operating shaft 302 is supported to the housing 306 so that the operating shaft 302 is prevented from rotating relatively to the housing 306 and is allowed to move in the directions of the axis. The operating shaft 302 has, at one end thereof, a connecting portion 302*a* connected to the lever 230, and has, at another end thereof, a screw shaft portion 302*b*.

The nut 312*a* and the screw shaft portion 302*b* of the operating shaft 302 are interconnected by a ball screw mechanism (not shown) similar to the ball screw 118 illustrated as a motion converting mechanism in FIG. 2. Thus, rotation of the nut 312*a* is converted into a movement of the operating shaft 302 in a direction of the axis thereof.

In the third embodiment, due to the return spring 218 (that serves as urging means for urging the braking members in such a direction as to move the braking member away from the braked member, and serves as return force applying means for applying to the electric motor a force in a direction opposite to the direction of a force whereby the electric motor presses the braking members against the braked member) and the like, the brake shoes 202*a*, 202*b* receive force in such a direction as to move away from the drum inner peripheral surface 204. Furthermore, the motion converting mechanism of the electric actuator 300 employs a ball screw mechanism that achieves high inverse efficiency. Therefore, if the electric motor 73 is not supplied with current, the brake shoes 202a, 202b separate from the drum inner peripheral surface 204, and the actual pressurizing force P naturally decreases. Therefore, programs similar to those in the second embodiment are adopted to control the supply current I to the electric motor 73.

As described above, according to the foregoing embodiments, control of a brake employing an electric motor as an actuator is appropriately carried out. The invention is not limited to the foregoing embodiments, but includes various modifications within the scope of the invention. For example, although in the foregoing embodiments, the direct-current electric motors 11 (73) are employed as drive power sources for the actuators for all the wheels, the invention is also applicable to a vehicle in which at least one of the wheels is provided with a direct-current electric motor 11 (73). In this case, the vehicle may have an arrangement in which the front right and left wheels FR, FL are provided with conventional hydraulic brake devices, and the rear right and left wheels RR, RL are provided with electric brake devices employing electric motors, or an arrangement in which the front right and left wheels FR, FL are provided with electric brake devices employing electric motors, and the rear right and left wheels RR, RL are provided with conventional hydraulic brake devices.

The brake employed for each wheel may be a disc brake or a drum brake, and may be provide with or without a return mechanism as described above. In this case, in accordance with there is a return mechanism, the programs of the first embodiment or the second embodiment may be suitably adopted. Furthermore, although in the foregoing embodiments, the brake torque control based on a quantity of state of the vehicle other than the amount of brake operation is the ABS control, the control may also be a different braking torque control, for example, a traction control, an automatic brake control, an emergency brake control, a vehicle behavior stabilizing control, etc. For example, the quantity of state of the vehicle may be based on the quantity of steering of the vehicle, the yaw rate, etc., as well as the slip rate of the wheel, and the brake control may be performed so as to stabilize the vehicle. Still further, if a wheel excessively slips, a corresponding electric motor may be supplied with current so as to apply braking force only to the excessively slipping wheel. In such controls, it is also practicable to adopt a control of maintaining a braking torque in addition to controls of increasing and reducing the braking torque so as to stabilize the vehicle or reduce the braking distance of the vehicle.

In the foregoing embodiments, the thresholds A, B, the positive values a, b, c, d, and the reference values −e1, −e2, −e3, e4 may be changed in accordance with the state of the vehicle. For example, when the pulse amplitude of a signal based on the pressurizing force sensed by a pressurizing sensor becomes greater than a predetermined amplitude, it is determined that the vehicle is running on a gravel road, and the aforementioned values are changed to values that are optimal when the coefficient of friction between the road surface and the tires is small.

The electric motors 11, 73 in the foregoing embodiments are mere examples of an electric driving device and an electric motor in the invention. The electric driving device may an electromagnetically driven device that is linearly driven.

In the invention, controlling the supply of electrical current to the electric driving device (the electric motor) so that the electric driving device (the electric motor) does not drive (rotate) in a the predetermined direction includes controlling the supply of electric current to the electric driving device (the electric motor) so that the force pressing the braking member against the braked member is lower than a restoring force of the braking member to restore in its original state, discontinuing the current supplied to the electric driving device (the electric motor), prohibiting the current from being supplied to the electric driving device (the electric motor), preventing the current from being supplied to the electric driving device (the electric motor), refraining from supplying supply current by cutting off the current, and supplying a current that drives (rotates) the electric driving device (the electric motor) in a direction opposite to a predetermined direction. Furthermore, in a vehicular brake control apparatus having return force applying means (e.g., brake control apparatuses having a return spring as in the second and third embodiments), controlling the supply of electrical current to the electric driving device (the electric motor) so that the electric driving device (the electric motor) does not drive (rotate) the electric driving device (the electric motor) in a the predetermined direction includes supplying a current that drives (rotates) the electric driving device (the electric motor) in the predetermined direction by a force that is weaker than a combined force of the restoring force of the braking member to restore in its original state and the restoration force of the return spring.

In the invention, controlling the supply of electrical current to an electric driving device (the electric motor) so that the electrical current supplied to the electric driving device (the electric motor) is lower than required electrical current to dive (rotate) the electric driving device (the electric motor) in a the predetermined direction includes controlling the supply of electric current to the electric driving device (the electric motor) so that the force pressing the braking member against the braked member is lower than a restoring force of the braking member to restore in its original state, discontinuing the current supplied to the electric driving device (the electric motor), prohibiting the current from being supplied to the electric driving device (the electric motor), preventing the current from being supplied to the electric driving device (the electric motor), refraining from supplying supply current by cutting off the current, and supplying a current that drives (rotates) the electric driving device (the electric motor) in a direction opposite to a predetermined direction. Furthermore, in a vehicular brake control apparatus having return force applying means (e.g., brake control apparatuses having a return spring as in the second and third embodiments), controlling the supply of electrical current to the electric driving device (the electric motor) so that the electrical current supplied to the electric driving device (the electric motor) is lower than required electrical current to drive (rotate) the electric driving device (the electric motor) in a the predetermined direction includes supplying a current that drives (rotates) the electric driving device (the electric motor) in the predetermined direction by a force that is weaker than a combined force of the restoring force of the braking member to restore in its original state and the restoration force of the return spring.

The "lower" of "controlling the supply of electrical current to electric driving device (the electric motor) so that the electrical current supplied to the electric driving device (the electric motor) is lower than required electrical current to drive (rotate) the electric driving device (the electric motor)

in a the predetermined direction" means "lower" when "the electrical current supplied to the electric driving device (the electric motor)" and "required electrical current to drive (rotate) the electric driving device (the electric motor) in a the predetermined direction" are compared in a same direction of electrical current. That is, the value of the electrical current to drive (rotate) the electric driving device (the electric motor) in the predetermined direction is plus. The value of the electrical current to drive (rotate) the electric driving device (the electric motor) in the direction opposite to the predetermined direction is minus. The electrical current in discontinuing the current supplied to the electric driving device (the electric motor) is zero.

The invention claimed is:

1. A vehicular brake control apparatus comprising:
a braked member that rotates together with a wheel;
a braking member that produces a braking torque when pressed against the braked member;
an electric driving device that presses the braking member against the braked member by driving in a predetermined direction so as to apply a braking torque to the wheel when being supplied with electric current;
an operational state detector that detects an operational state of the vehicle which includes a quantity of brake operation, and provides a quantity of state representative of the operational state of the vehicle;
a braking torque change request determiner that selectively determines that the braking torque is to be increased and that the braking torque is to be reduced, based on the quantity of brake operation; and
a current controller that controls the supply of electrical current to the electric driving device so that the electric driving device is caused to drive in a predetermined direction if it is determined that the braking torque is to be increased,
wherein the current controller controls the supply of electrical current to the electric driving device so that the supply of electrical current is discontinued if it is determined that the braking torque is to be reduced based on the quantity of brake operation by a driver, and controls the supply of the electric current to the electric driving device so that the electric driving device is rotated in a direction opposite to the predetermined direction if it is determined that the braking torque is to be reduced based on the quantity of the operational state of the vehicle other than the quantity of brake operation.

2. The vehicular brake control apparatus of claim 1, wherein:
the electric driving device includes an electric motor.

3. The vehicular brake control apparatus of claim 1, wherein:
the current controller controls the supply of electric current to the electric driving device so that the supply of a predetermined electric current to the electric driving device is started if a requested quantity of change in the braking torque based on the quantity of state becomes greater than a predetermined value.

4. The vehicular brake control apparatus of claim 3, further comprising:
pressurizing force detector that detects an actual pressurizing force whereby the electric driving device presses the braking member against the braked member,
wherein the current controller determines a target pressurizing force based on the quantity of state and determines a requested quantity of change in the braking torque in accordance with a difference between the actual pressurizing force and the target pressurizing force.

5. The vehicular brake control apparatus of claim 1, wherein:
the operational state detector detects a slip rate of the wheel; and
the current controller that controls the supply of electric current to the electric driving device so that a changing rate of the pressurizing force is changed in accordance with the slip rate.

6. The vehicular brake control apparatus of claim 5, wherein:
the current controller controls the supply of electric current to the electric driving device so that the pressurizing force is rapidly reduced and then is gently reduced, if the slip rate becomes greater than a predetermined value.

7. The vehicular brake control apparatus of claim 6, wherein:
the current controller controls the supply of electric current to the electric driving device so that the pressurizing force is reduced and then is increased and a changing rate of the pressurizing force while the pressurizing force is increased decreases gradually, if the slip rate becomes greater than a predetermined value.

8. The vehicular brake control apparatus of claim 6, wherein:
the predetermined value is a value for determining a possibility of the wheel being locked, and
a change in current from a current that causes the electric driving device to rapidly reduce the braking torque to a current that causes the electric driving device to gently reduce the braking torque is carried out when the possibility of the wheel being locked disappears.

9. The vehicular brake control apparatus of claim 1, wherein:
the current controller controls the supply of electric current to the electrical driving device so that the electrical driving device is caused to maintain the braking torque if it is determined that the braking torque is to be held at a constant value on the basis of the quantity of state detected.

10. The vehicular brake control apparatus of claim 1, further comprising:
return force applying means for applying to the electrical driving device a force in a direction opposite to a direction of a force by which the electrical driving device presses the braking member against the braked member.

11. The vehicular brake control apparatus of claim 1, wherein:
the electric driving device presses the braking member via a ball screw mechanism against the braked member, and the ball screw mechanism includes balls and a shaft, and changes a rotational motion using the balls to a linear motion using the shaft so that the shaft presses the braking member.

12. A control method of a vehicular brake apparatus having:
a braked member that rotates together with a wheel;
a braking member that produces a braking torque when pressed against the braked member;
an electric driving device that presses the braking member against the braked member by driving in a predetermined direction so as to apply a braking torque to the wheel when being supplied with electric current;

comprising the steps of:
- detecting an operational state of the vehicle, wherein detecting the operational state includes detecting a quantity of brake operation;
- providing a quantity of state representative of the operational state of the vehicle;
- determining selectively whether the braking torque is to be increased and is to be reduced, based upon the quantity of state;
- controlling the supply of electrical current to the electric driving device so that the electric driving device is caused to rotate in a predetermined direction if it is determined that the braking torque is to be increased, and so that the electric driving device is caused to reduce the braking torque if it is determined that the braking torque is to be reduced;
- controlling the supply of electrical current to the electric driving device so that the supply of electric current is discontinued if it is determined that the braking torque is to be reduced based on the detected quantity of brake operation; and
- controlling the supply of the electric current to the electric driving device so that the electric driving device is rotated in a direction opposite to the predetermined direction if it is determined that the braking torque is to be reduced based on the quantity of the operational state of the vehicle other than the quantity of brake operation.

13. A control method of a vehicular brake apparatus having:
- a braked member that rotates together with a wheel;
- a braking member that produces a braking torque when pressed against the braked member;
- an electric driving device that presses the braking member against the braked member by driving in a predetermined direction to apply a braking torque to the wheel when being supplied with electric current, comprising the steps of:
- detecting the operational state of the vehicle wherein detecting the operational state includes detecting a slip rate of the wheel and a quantity of brake operation,
- determining whether the slip rate has become greater than a predetermined value, and
- controlling the supply of electric current to the electric driving device so that the braking torque is rapidly reduced when the slip rate becomes greater than a first threshold value, and then the braking torque is gently reduced when the slip rate becomes smaller than a second threshold value that is smaller than the first threshold value, wherein the electric driving device is caused to drive in a direction opposite to the predetermined direction if it is determined that
- the braking torque is to be reduced based on the operational state of the vehicle other than the quantity of brake operation
- wherein the first threshold value is a value for determining a possibility of the wheel being locked, and
- a change in current from a current that causes the electric driving device to rapidly reduce the braking torque to a current that causes the electric driving device to gently reduce the braking torque is carried out when the possibility of the wheel being locked disappears
- wherein the step of controlling the supply of electric current to the electric driving device includes supplying the electric driving device with electric current that causes the electric driving device to rapidly reduce the braking torque and then increase the braking torque, and so that a changing rate of the braking torque while the braking torque is being increased decreases gradually, if the slip rate becomes greater than the first threshold value.

* * * * *

UNITED STATES PATENT AND TRADEMARK OFFICE
CERTIFICATE OF CORRECTION

PATENT NO. : 7,198,336 B2
APPLICATION NO. : 10/381702
DATED : April 3, 2007
INVENTOR(S) : Takayuki Yamamoto et al.

It is certified that error appears in the above-identified patent and that said Letters Patent is hereby corrected as shown below:

| Column | Line | |
|---|---|---|
| 1 | 65 | Change "in," to --in the--. |
| 2 | 12 | After "in" delete "a". |
| 2 | 17 | After "so that" insert --it--. |
| 5 | 26 | Change "a the" to --the--. |
| 5 | 30 | After "driving device in" delete "a". |
| 6 | 37 | Change "sate" to --state--. |
| 7 | 44 | Change "An tenth" to --A tenth--. |
| 8 | 35 | Change "An twelfth" to --A twelfth--. |
| 8 | 55 | Change "An thirteenth" to --A thirteenth--. |
| 8 | 62 | Delete "when being supplied with electric current,". |
| 14 | 14 | After "time t1)" insert --.--. |
| 18 | 64 | After "predetermined" insert --relationship--. |
| 22 | 52 | Change "of in" to --of--. |
| 23 | 22 | Change "before till" to --before t11--. |
| 24 | 67 | Change "a the" to --the--. |

UNITED STATES PATENT AND TRADEMARK OFFICE
CERTIFICATE OF CORRECTION

PATENT NO. : 7,198,336 B2
APPLICATION NO. : 10/381702
DATED : April 3, 2007
INVENTOR(S) : Takayuki Yamamoto et al.

It is certified that error appears in the above-identified patent and that said Letters Patent is hereby corrected as shown below:

| Column | Line | |
|---|---|---|
| 25 | 22 | Change "a the" to --the--. |
| 25 | 45 | Change "a the" to --the--. |
| 25 | 57 | After "(threshold A, B)" insert --.--. |
| 30 | 15 | Change "instep 1695" to --in step 1695--. |
| 31 | 50 | Change "a the" to --the--. |
| 32 | 6 | Change "a the" to --the--. |
| 32 | 42 | After "which are the" insert --portions--. |
| 35 | 31 | Change "provide" to --provided--. |
| 35 | 33 | Change "is" to --being--. |
| 35 | 66 | After "may" insert --be--. |
| 36 | 4 | Change "a the" to --the--. |
| 36 | 8 | After "restore" insert --it--. |
| 36 | 24 | Change "a the" to --the--. |
| 36 | 34 | Change "dive" to --drive--. |
| 36 | 35 | Change "a the" to --the--. |

UNITED STATES PATENT AND TRADEMARK OFFICE
CERTIFICATE OF CORRECTION

PATENT NO. : 7,198,336 B2
APPLICATION NO. : 10/381702
DATED : April 3, 2007
INVENTOR(S) : Takayuki Yamamoto et al.

It is certified that error appears in the above-identified patent and that said Letters Patent is hereby corrected as shown below:

| Column | Line | |
|--------|------|---|
| 36 | 39 | After "restore" insert --it--. |
| 36 | 56 | Change "a the" to --the--. |
| 36 | 60 | After "restore" insert --it--. |
| 37 | 1 | Change "in a the" to --in the--. |
| 37 | 4 | After "(the electric motor) in" delete "a". |

Signed and Sealed this

Fifteenth Day of April, 2008

JON W. DUDAS
*Director of the United States Patent and Trademark Office*